United States Patent
Chockalingam et al.

(10) Patent No.: US 8,116,411 B2
(45) Date of Patent: Feb. 14, 2012

(54) METHOD TO DETECT DATA TRANSMITTED FROM MULTIPLE ANTENNAS AND SYSTEM THEREOF

(75) Inventors: Ananthanarayanan Chockalingam, Bangalore (IN); Balaji Sundar Rajan, Bangalore (IN); Kalepalli Vishnu Vardhan, Bangalore (IN); Saif Khan Mohammed, Bangalore (IN)

(73) Assignee: Indian Institute of Science, Bangalore (IN)

( * ) Notice: Subject to any disclaimer, the term of this patent is extended or adjusted under 35 U.S.C. 154(b) by 1201 days.

(21) Appl. No.: 11/842,963

(22) Filed: Aug. 22, 2007

(65) Prior Publication Data
US 2009/0041145 A1 Feb. 12, 2009

(30) Foreign Application Priority Data
Aug. 6, 2007 (IN) .......................... 01725/CHE/2007

(51) Int. Cl.
*H04L 27/06* (2006.01)
(52) U.S. Cl. ........................................ 375/341; 375/147
(58) Field of Classification Search .......... 375/130–132, 375/140, 147, 218, 316, 340, 341, 349
See application file for complete search history.

(56) References Cited

U.S. PATENT DOCUMENTS

| | | | |
|---|---|---|---|
| 2004/0083082 A1* | 4/2004 | Onggosanusi et al. | 703/2 |
| 2006/0256888 A1* | 11/2006 | Nissani (Nissensohn) | 375/267 |
| 2007/0280370 A1* | 12/2007 | Liu | 375/267 |
| 2008/0279299 A1* | 11/2008 | Reuven et al. | 375/267 |

OTHER PUBLICATIONS

Y. Sun, "A Family of Linear Complexity Likelihood Ascent Search Multiuser Detectors for CDMA Communications", in Conf. Record of the Thirty-Fourth Asilomar Conf. on Signals, Systems and Computers, 2000; pp. 1163-1167: ISBN 0-7803-6514-3.*
J. Fan et al. "Near Maximum Likelihood Detection for Wireless MIMO Systems", IEEE Transactions on Wireless Communications, vol. 3, No. 5. Sep. 2004: pp. 1427-1430: ISSN: 1536-1276.*
H. Jafarkhani, Space-Time Coding: Theory and Practice, Cambridge University Press, 2005.
D. Tse and P. Viswanath, Fundamentals of Wireless Communication, Chapter I, Cambridge University Press, 2005.
G. J. Foschini, "Layered space-time architecture for wireless communication in a fading environment when using multi-element antennas," Bell Labs Tech. Jl., vol. 1, pp. 41-59, Aug. 1996.
G. J. Foschini and M. J. Gans, "On limits of wireless communications in a fading environment when using multiple antennas," Wireless Pers. Commun., vol. 6, pp. 311-335, Mar. 1998.

(Continued)

*Primary Examiner* — David C. Payne
*Assistant Examiner* — James M Perez
(74) *Attorney, Agent, or Firm* — Perkins Coie LLP; Aaron Wininger

(57) ABSTRACT

A method to detect data transmitted from multiple antennas, said method comprising steps of: selecting a starting data block and calling it as previous data block; defining a set of indices of bits to be checked for possible flip in the previous data block as a check candidate set; applying update rule to obtain updated data block using the previous data block and the check candidate set, wherein the update is made in such a manner that change in likelihood is positive; checking if the updated data block and several consecutive previous data blocks are the same; if yes, declare the updated data block as the detected data block; if no, make updated data block as previous data block and repeat updation of data block.

28 Claims, 15 Drawing Sheets

OTHER PUBLICATIONS

Figure 1:
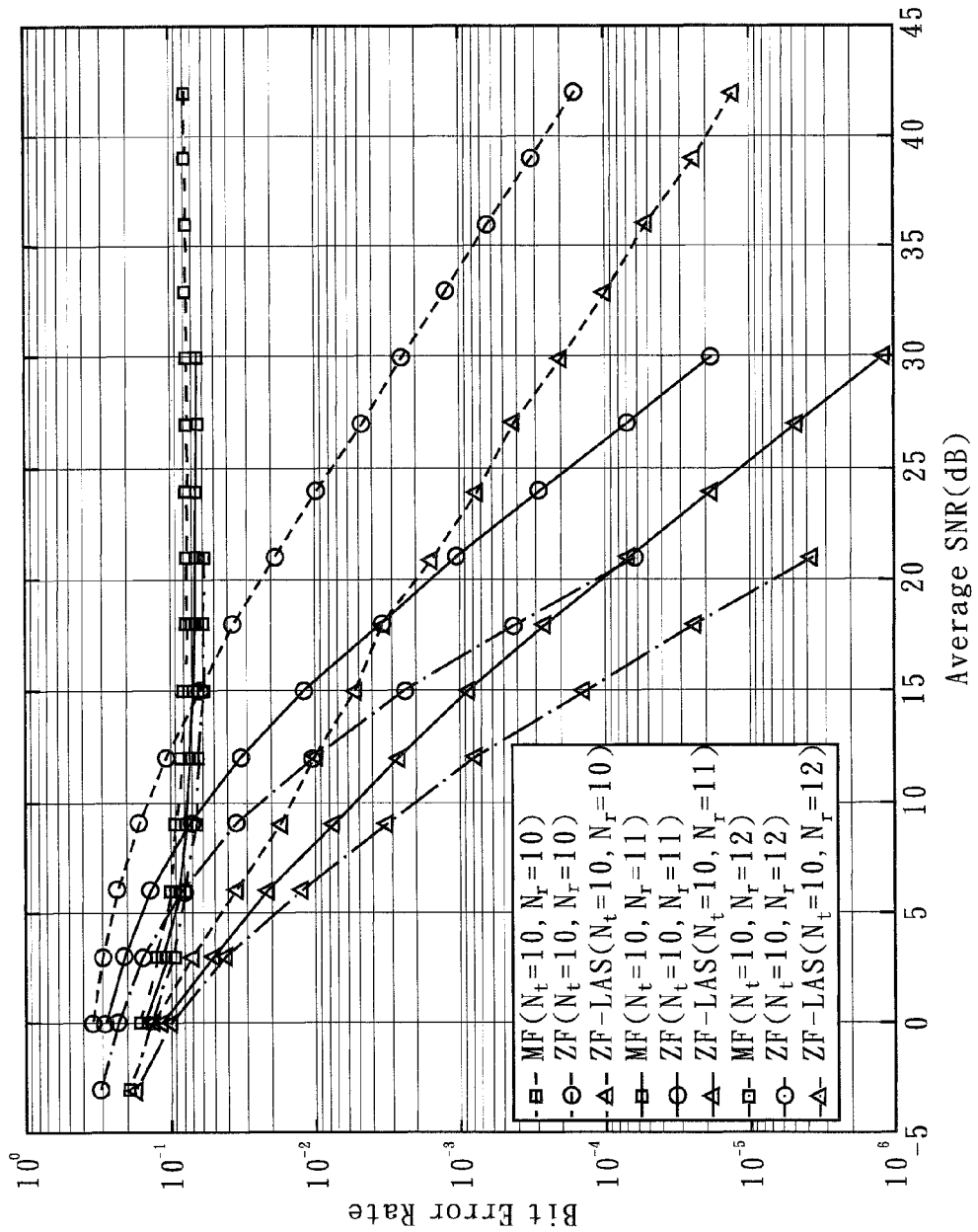

E. Teletar, "Capacity of multi-antenna Gaussian channels," Eur. Trans. Telecomm., vol. 10, No. 6, pp. 585-595, Nov. 1999.

G. J. Foschini, "Layered space-time architecture for wireless communication in a fading environment when using multielement antennas," Bell Labs Tech. Jl., vol. 1, pp. 41-59, 1996.

E. Viterbo and J. Boutros, "A universal lattice code decoder for fading channels," IEEE Trans. Inform. Theory, vol. 45, No. 5, pp. 1639-1242, Jul. 1999.

B. Hassibi and H. Vikalo, "On the sphere-decoding algorithm I. Expected complexity," IEEE Trans. Signal Process., vol. 53, No. 8, pp. 2806-2818, Aug. 2005.

H. Vikalo and B. Hassibi, "On the sphere-decoding algorithm II. Generalizations, second-order statistics, and applications to communications," IEEE Trans. Signal Process., vol. 53, No. 8, pp. 2819-2834, Aug. 2005.

W. Zhao and G. Giannakis, "Sphere decoding algorithms with improved radius search," IEEE Trans. Commun., vol. 53, No. 7, pp. 1104-1109, Jul. 2005.

H. D. Zhu, B. Farhang-Boroujeny, and R.-R. Chen, "On the performance of sphere decoding and Markov chain Monte Carlo detection methods," IEEE Signal Proc. Letters, vol. 12, No. 10, pp. 669-672, Oct. 2005.

L. Azzam and E. Ayanoglu, "Reduced complexity sphere decoding for square QAM via a new lattice representation," arXiv:0705.2435v1 [cs.IT] May 16, 2007.

P. W. Woliniansky, G. J. Foschini, G. D. Golden, and R. A. Valenzuela, "V-BLAST: an architecture for realizing very high data rates over the rich-scattering wireless channel," Proc. ISSSE, pp. 295-300, Sep.-Oct. 1998.

G. D. Golden, G. J. Foschini, R. A. Valenzuela, and P. W. Wolniansky, "Detection algorithm and initial laboratory results using V-BLAST space-time communication architecture," Electron. Lett., vol. 35, No. 1, pp. 14-16, Jan. 1999.

Y.-T. Zhou, R. Chellappa, A. Vaid, and B. K. Jenkins, "Image restoration using a neural network," IEEE Trans. on Acoust., Speech, Signal Process., vol. 36, No. 7, pp. 1141-1151, Jul. 1988.

Y. Sun, J -G. Li, and S.-Y. Yu, Improvement on performance of modified Hopfield neural network for image restoration, IEEE Trans. on Image Process., vol. 4, No. 5, pp. 688-692, May 1995.

Y. Sun, "Hopfield neural network based algorithms for image restoration and reconstruction—Part I: Algorithms and simulations," IEEE Trans. on Signal Process., vol. 48, No. 7, pp. 2105-2118, Jul. 2000.

Y. Sun, "Hopfield neural network based algorithms for image restoration and reconstruction—Part II: Performance analysis," IEEE Trans. on Signal Process., vol. 48, No. 7, pp. 2119-2131, Jul. 2000.

Y. Sun, "Eliminating-highest-error and fastest-metric-descent criteria and iterative algorithms for bit synchronous CDMA multiuser detection," Proc. IEEE ICC'98, pp. 1576-1580, Jun. 1998.

Y. Sun, "A family of linear complexity likelihood ascent search detectors for CDMA multiuser detection," Proc. IEEE 6th Intl. Symp. on Spread Spectrum Tech. & App., Sep. 2000.

L. Hanzo, L-L. Yang, E-L. Kuan, and K. Yen, Single- and Multi-carrier DS-CDMA: Multiuser Detection, Space-Time Spreading, Synchronization and Standards, IEEE Press, 2003.

S. Manohar, V. Tikiya, R. Annavajjala, and A. Chockalingam, "BER-optimal linear parallel interference cancellation for multicarrier DS-CDMA in Rayleigh fading," IEEE Trans. Commun., Jun. 2007.

B. Farhang-Boroujeny, H. D. Zhu, and Z. Shi, "Markov chain Monte Carlo algorithms for CDMA and MIMO communication systems," IEEE Trans. on Sig. Process., vol. 54, No. 5, pp. 1896-1908,May 2006.

B. A. Sethuraman, B. Sundar Rajan and V. Shashidhar, "Full-diversity, high-rate space-time block codes from division algebras," IEEE Trans. Inform. Theory, vol. 49, No. 10, pp. 2596-2616, Oct. 2003.

IEEE C802.16e-04/532r3, Pilot allocations for 5, 6, 7, and 8 BS antennas, IEEE 802.16 Broadband Wireless Access Working Group, Nov. 12, 2004.

\* cited by examiner

METHOD TO DETECT DATA TRANSMITTED FROM MULTIPLE ANTENNAS AND SYSTEM THEREOF

FIELD OF INVENTION

The present invention relates to large Multiple-input multiple-output (MIMO) systems, where by 'large' we mean large number of transmit and receive antennas of the order of tens to thousands. Such large MIMO systems will be of immense interest because of the very high spectral efficiencies possible in such systems. For example, in a V-BLAST system, increased number of transmit antennas means increased data rate without bandwidth increase. However, two major bottlenecks in realizing such large MIMO systems are i) physical placement of such a large number of antennas in communication terminals; for small terminal sizes, this would require a high carrier frequency operation, i.e., small carrier wavelengths for $\lambda/2$ separation to ensure independence between antennas, and ii) lack of practical low-complexity detectors for such large systems. The latter problem is addressed in this invention.

BACKGROUND OF PRESENT INVENTION AND PRIOR ART

Multiple-input multiple-output (MIMO) systems with multiple antennas at both transmitter and receiver sides have become very popular owing to the several advantages they promise to offer, including transmit diversity and spatial multiplexing [1]-[3]. It is known that the MIMO channels have a capacity that grows linearly with the minimum of the number of antennas on the transmitter and receiver sides [4]-[6]. A key component of a MIMO system is the MIMO detector at the receiver, whose job is to recover the symbols that are transmitted simultaneously from multiple transmitting antennas. In practical applications, the MIMO detector is often the bottleneck for both performance and complexity.
MIMO detectors including sphere decoder and several of its variants [8]-[13] achieve near-ML performance at the cost of high complexity. Other well known detectors including ZF (zero forcing), MMSE (minimum mean square error), and ZF/MMSE-SIC (ZF/MMSE with successive interference cancellation) detectors [14] are attractive from a complexity view point, but achieve relatively poor performance. Maximum number of transmit and receive antennas for which the performance of MIMO detectors have been reported in the literature so far is only in the range of 10 to 20 (e.g., 16 antennas for sphere decoder [8] and 12 antennas for ZF-SIC [15]).
The ZF-LAS detector for V-BLAST is shown to achieve the following gains compared to the well known V-BLAST detector (i.e., the ZF-SIC detector with ordering) under signal-to-noise ratios (SNR) and bit error rates (BER) of interest: i) for moderate number of antennas (e.g., about 30 antennas), ZF-LAS achieves complexity gain compared to ZF-SIC, and ii) for large number of antennas, ZF-LAS achieves both complexity gain as well as bit error performance gain compared to ZF-SIC. The achieved complexity gain significantly increases with increasing number of antennas due to the average per-bit complexity of $O(N_tN_r)$ for ZF-LAS versus per-bit complexity of $O(N_t^2N_r)$ for ZF-SIC. The fact that we could show the simulation points of uncoded BER up to $10^{-5}$ in V-BLAST systems with several hundreds of antennas demonstrates the ZF-LAS detector's fantastic low-complexity attribute (which other known detectors have not been shown to possess). For large Nt, ZF-LAS not only has lesser complexity but also achieves much better diversity than ZF-SIC, which is a significant and interesting result. This practical detection feasibility could potentially trigger wide interest in the theory and implementation of large MIMO systems.
Interestingly, even for a near-term practical system like 8×8 V-BLAST system with 4-QAM and rate-½ outer turbo code (i.e., 8 bps/Hz spectral efficiency), ZF-LAS achieves a BER of $10^{-4}$ at an Eb/N0 of 6 dB with 3 turbo decoding iterations. Likewise, a 15×15 V-BLAST system with 4-QAM and rate-⅓ turbo outer code (i.e., 10 bps/Hz spectral efficiency), ZF-LAS achieves a BER of $10^{-5}$ at an $E_b/N_0$ of just 3 dB with 3 turbo decoding iterations. The complexity involved with achieving similar performances using the well known ZF-SIC detector is comparatively very large. We also show that ZF-LAS is effective in decoding high-rate, non-orthogonal STBCs. We also present ZF/MF-LAS detectors for multicarrier CDMA. With its superiority in performance and complexity for large number of users, MF-LAS can be a powerful approach to MUD implementations in practical CDMA systems.

REFERENCES

[1] A. Paulraj, R. Nabar, and D. Gore, Introduction to Space-Time Wireless Communications, Cambridge University Press, 2003.
[2] H. Jafarkhani, Space-Time Coding: Theory and Practice, Cambridge University Press, 2005.
[3] D. Tse and P. Viswanath, Fundamentals of Wireless Communication, Cambridge University Press, 2005.
[4] G. J. Foschini, "Layered space-time architecture for wireless communication in a fading environment when using multi-element antennas," Bell Labs Tech. Jl., vol. 1, pp. 41-59, August 1996.
[5] G. J. Foschini and M. J. Gans, "On limits of wireless communications in a fading environment when using multiple antennas," Wireless Pers. Commun., vol. 6, pp. 311-335, March 1998.
[6] E. Teletar, "Capacity of multi-antenna Gaussian channels," Eur. Trans. Telecomm., vol. 10, no. 6, pp. 585-595, November 1999.
[7] G. J. Foschini, "Layered space-time architecture for wireless communication in a fading environment when using multielement antennas," Bell Labs Tech. Jl., vol. 1, pp. 41-59, 1996.
[8] E. Viterbo and J. Boutros, "A universal lattice code decoder for fading channels," IEEE Trans. Inform. Theory, vol. 45, no. 5, pp. 1639-1242, July 1999.
[9] B. Hassibi and H. Vikalo, "On the sphere-decoding algorithm I. Expected complexity," IEEE Trans. Signal Process., vol. 53, no. 8, pp. 2806-2818, August 2005.
[10] H. Vikalo and B. Hassibi, "On the sphere-decoding algorithm II. Generalizations, second-order statistics, and applications to communications," IEEE Trans. Signal Process., vol. 53, no. 8, pp. 2819-2834, August 2005.
[11] W. Zhao and G. Giannakis, "Sphere decoding algorithms with improved radius search," IEEE Trans. Commun., vol. 53, no. 7, pp. 1104-1109, July 2005.
[12] H. D. Zhu, B. Farhang-Boroujeny, and R.-R. Chen, "On the performance of sphere decoding and Markov chain Monte Carlo detection methods," IEEE Signal Proc. Letters, vol. 12, no. 10, pp. 669-672, October 2005.
[13] L. Azzam and E. Ayanoglu, "Reduced complexity sphere decoding for square QAM via a new lattice representation," arXiv:0705.2435v1 [cs.IT] 16 May 2007.
[14] S. Verdu, Multiuser Detection, Cambridge University Press, 1998.

[15] P. W. Woliniansky, G. J. Foschini, G. D. Golden, and R. A. Valenzuela, "V-BLAST: An architecture for realizing very high data rates over the rich-scattering wireless channel," Proc. ISSSE, pp. 295-300, September-October 1998.

[16] G. D. Golden, G. J. Foschini, R. A. Valenzuela, and P. W. Wolniansky, "Detection algorithm and initial laboratory results using V-BLAST space-time communication architecture," Electron. Lett., vol. 35, no. 1, pp. 14-16, January 1999.

[17] Y.-T. Zhou, R. Chellappa, A. Vaid, and B. K. Jenkins, "Image restoration using a neural network," IEEE Trans. on Acoust., Speech, Signal Process., vol. 36, no. 7, pp. 1141-1151, July 1988.

[18] Y. Sun, J.-G. Li, and S.-Y. Yu, Improvement on performance of modified Hopfield neural network for image restoration," IEEE Trans. on Image Process., vol. 4, no. 5, pp. 688-692, May 1995.

[19] Y. Sun, "Hopfield neural network based algorithms for image restoration and reconstruction—Part I: Algorithms and simulations," IEEE Trans. on Signal Process., vol. 48, no. 7, pp. 2105-2118, July 2000.

[20] Y. Sun, "Hopfield neural network based algorithms for image restoration and reconstruction—Part II: Performance analysis," IEEE Trans. on Signal Process., vol. 48, no. 7, pp. 2119-2131, July 2000.

[21] Y. Sun, "Eliminating-highest-error and fastest-metric-descent criteria and iterative algorithms for bit synchronous CDMA multiuser detection," Proc. IEEE ICC'98, pp. 1576-1580, June, 1998.

[22] Y. Sun, "A family of linear complexity likelihood ascent search detectors for CDMA multiuser detection," Proc. IEEE 6th Intl. Symp. on Spread Spectrum Tech. & App., September 2000.

[23] L. Hanzo, L-L. Yang, E-L. Kuan, and K. Yen, Single- and Multi-carrier DS-CDMA: Multiuser Detection, Space-Time Spreading, Synchronization and Standards, IEEE Press, 2003.

[24] S. Manohar, V. Tikiya, R. Annavajjala, and A. Chockalingam, "BER-optimal linear parallel interference cancellation for multicarrier DS-CDMA in Rayleigh fading," IEEE Trans. Commun., to appear in June 2007 issue.

[25] B. Farhang-Boroujeny, H. D. Zhu, and Z. Shi, "Markov chain Monte Carlo algorithms for CDMA and MIMO communication systems," IEEE Trans. on Sig. Process., vol. 54, no. 5, pp. 1896-1908, May 2006.

[26] B. A. Sethuraman, B. Sundar Rajan and V. Shashidhar, "Full-diversity, high-rate space-time block codes from division algebras," IEEE Trans. Inform. Theory, vol. 49, no. 10, pp. 2596-2616, October 2003.

[27] IEEE C802.16e-04/532r3, Pilot allocations for 5, 6, 7, and 8 BS antennas, IEEE 802.16 Broadband Wireless Access Working Group, 2004-11-12.

OBJECTS OF INVENTION

The principle objective of the present invention is to develop a method to detect data transmitted from multiple antennas.

Another objective of the invention is selecting a starting data block and calling it as previous data block;

Another objective of the invention is defining a set of indices of bits to be checked for possible flip in the previous data block as a check candidate set;

Another objective of the invention is applying update rule to obtain updated data block using the previous data block and the check candidate set, wherein the update is made in such a manner that change in likelihood is positive;

Another objective of the invention is checking if the updated data block and several consecutive previous data blocks are the same; if yes, declare the updated data block as the detected data block; if no, make updated data block as previous data block and repeat updation of previous data block.

Another main objective of the present invention is to develop a MIMO system.

Another objective of the invention is to develop multiple transmit antennas for data transmission.

Another objective of the invention is to develop multiple receive antennas for data reception.

Another objective of the invention is to develop a data detector using ZF/MF/MMSE/RV-LAS (zero-forcing/matched filter/minimum mean square error/random vector likelihood ascent search) to detect transmitted data, and Another objective of the invention is to develop a data detector which uses output data block from any known detector as the starting data block.

STATEMENT OF INVENTION

Accordingly the invention provides a method to detect data transmitted from multiple antennas, said method comprising steps of: (i) selecting a starting data block and calling it as previous data block; (ii) defining a set of indices of bits to be checked for possible flip in the previous data block as a check candidate set; (iii) applying update rule to obtain updated data block using the previous data block and the check candidate set, wherein the update is made in such a manner that change in likelihood is positive; (iv) checking if the updated data block and several consecutive previous data blocks are the same; if yes, declare the updated data block as the detected data block; if no, make updated data block as previous data block and go to step (ii). There is also provided a MIMO system comprising: multiple transmit antennas for data transmission, multiple receive antennas for data reception, a data detector using ZF/MF/MMSE/RV-LAS (zero-forcing/matched filter/minimum mean square error/random vector likelihood ascent search) to detect transmitted data, and a data detector which uses output data block from any known detector as the starting data block.

BRIEF DESCRIPTION OF ACCOMPANYING DRAWINGS

FIG. 1: shows uncoded BER performance for ZF-LAS detector for i) 10×10, ii) 10×11, and iii) 10×12 V-BLAST systems. 10 bps/Hz spectral efficiency.

Figure 2:
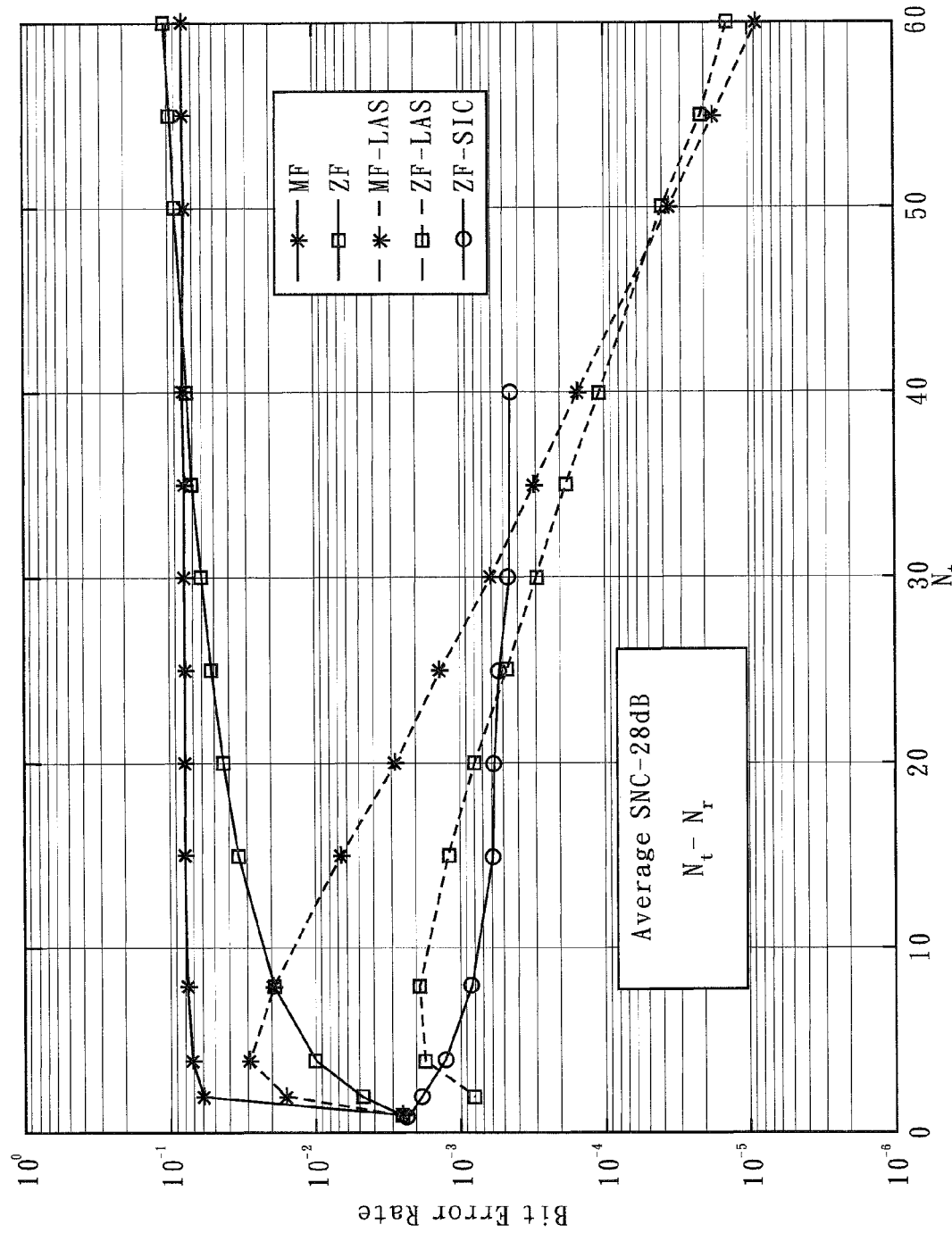

FIG. 2: shows uncoded BER performance of ZF-LAS detector as a function of number of transmit/receive antennas (Nt=Nr) for V-BLAST at an average SNR=20 dB. $N_t$ bps/Hz spectral efficiency.

Figure 3:
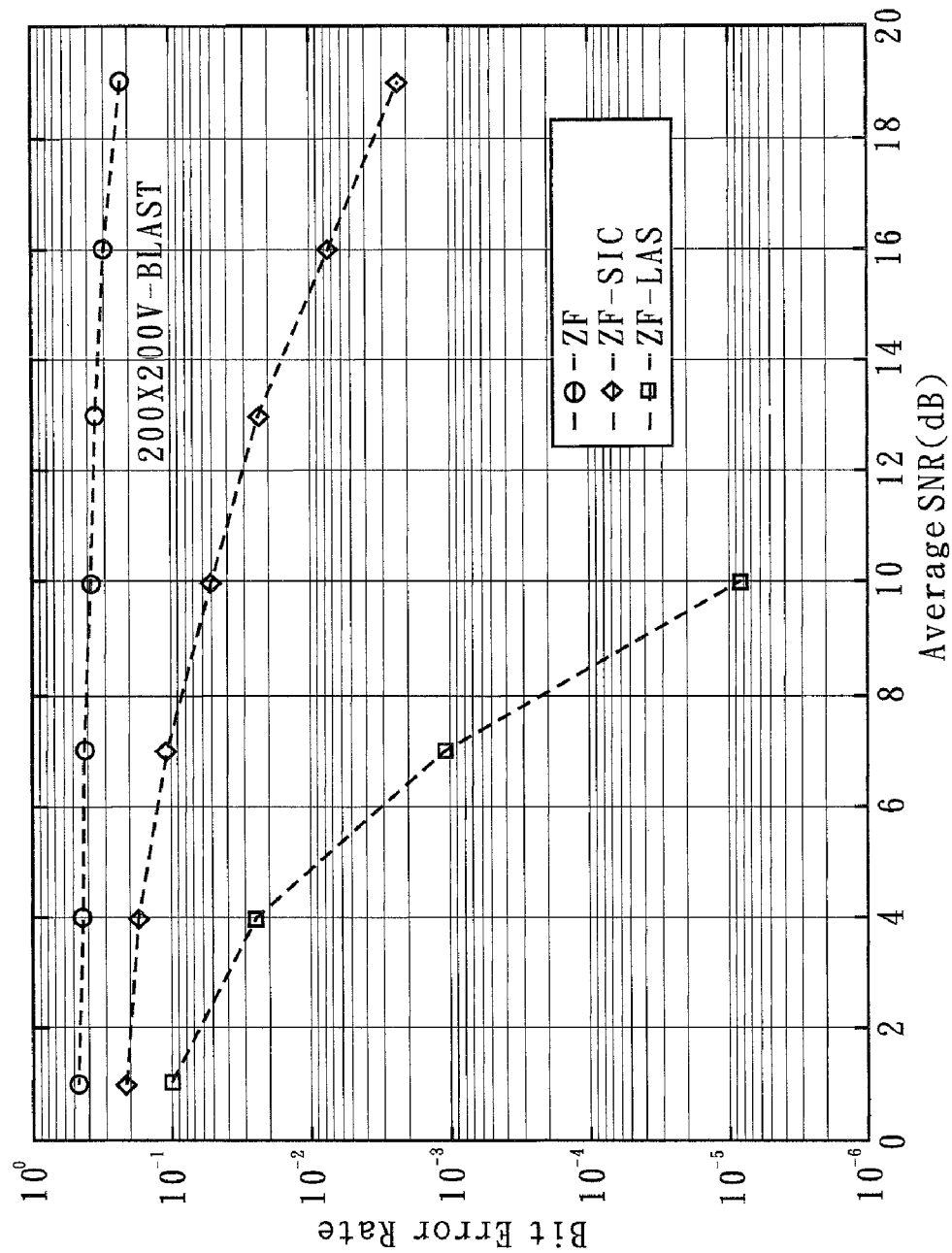

FIG. 3: shows uncoded BER performance of ZF-LAS versus ZF-SIC as a function of average SNR for a 200×200 V-BLAST system. 200 bps/Hz spectral efficiency. ZF-LAS achieves higher order diversity than ZF-SIC at a much lesser complexity.

Figure 4:
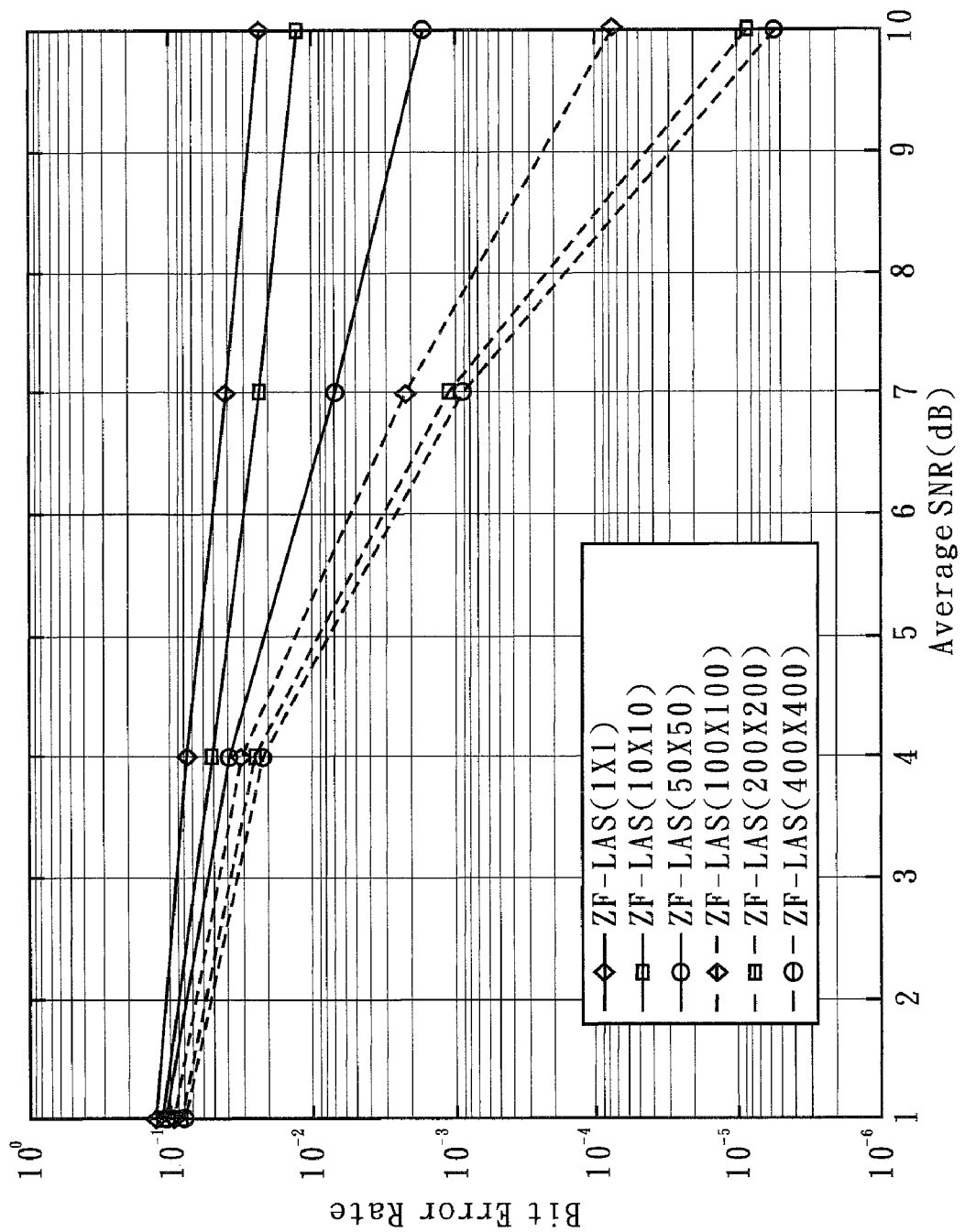

FIG. 4: shows uncoded BER performance of ZF-LAS for V-BLAST as a function of average SNR for different values of $N_t=N_tN_r$. Bps/Hz spectral efficiency.

Figure 5:
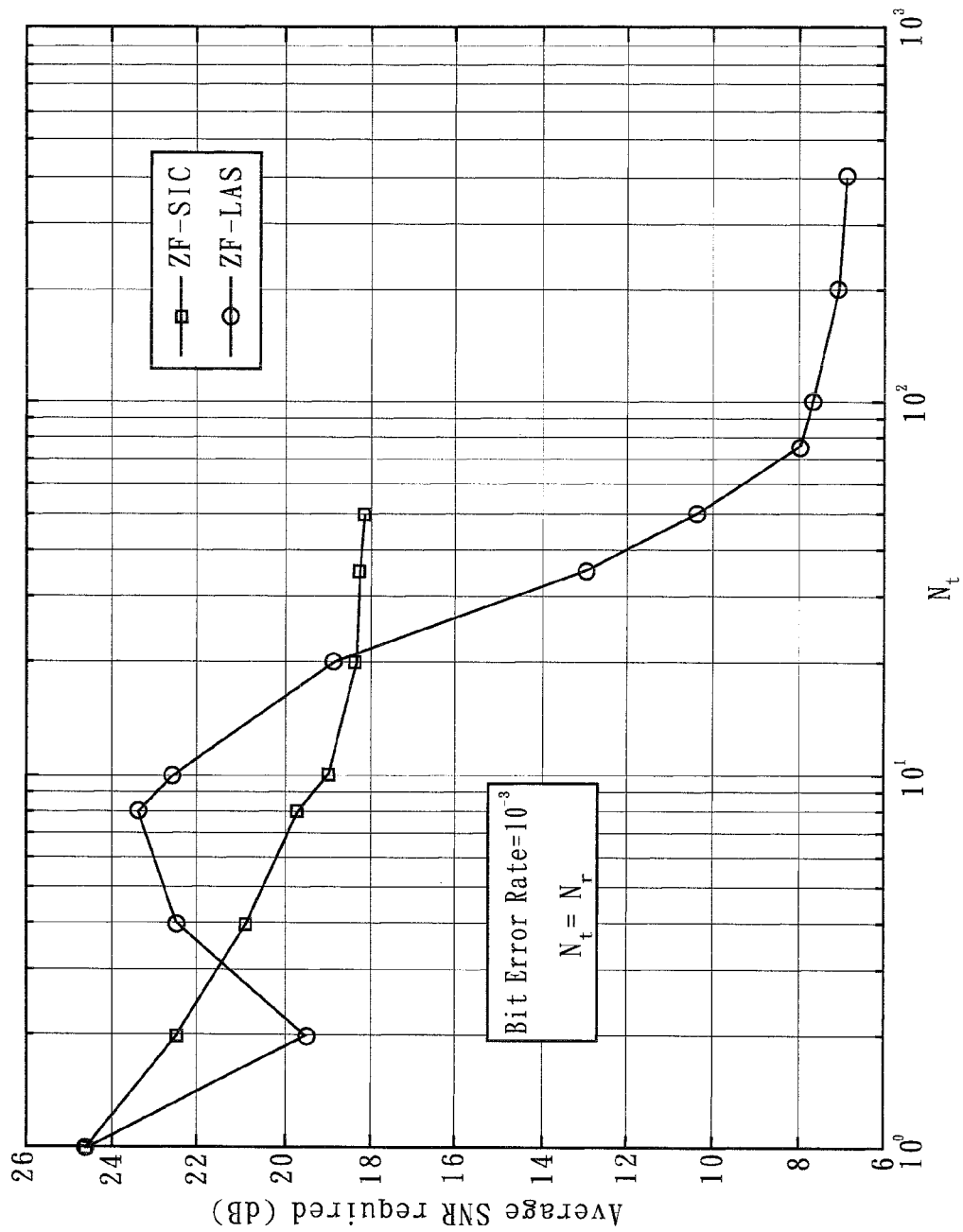

FIG. 5: shows average SNR required to achieve a target uncoded BER of $10^{-3}$ in V-BLAST for different values of Nt=Nr. ZF-LAS versus ZF-SIC.

Figure 6:
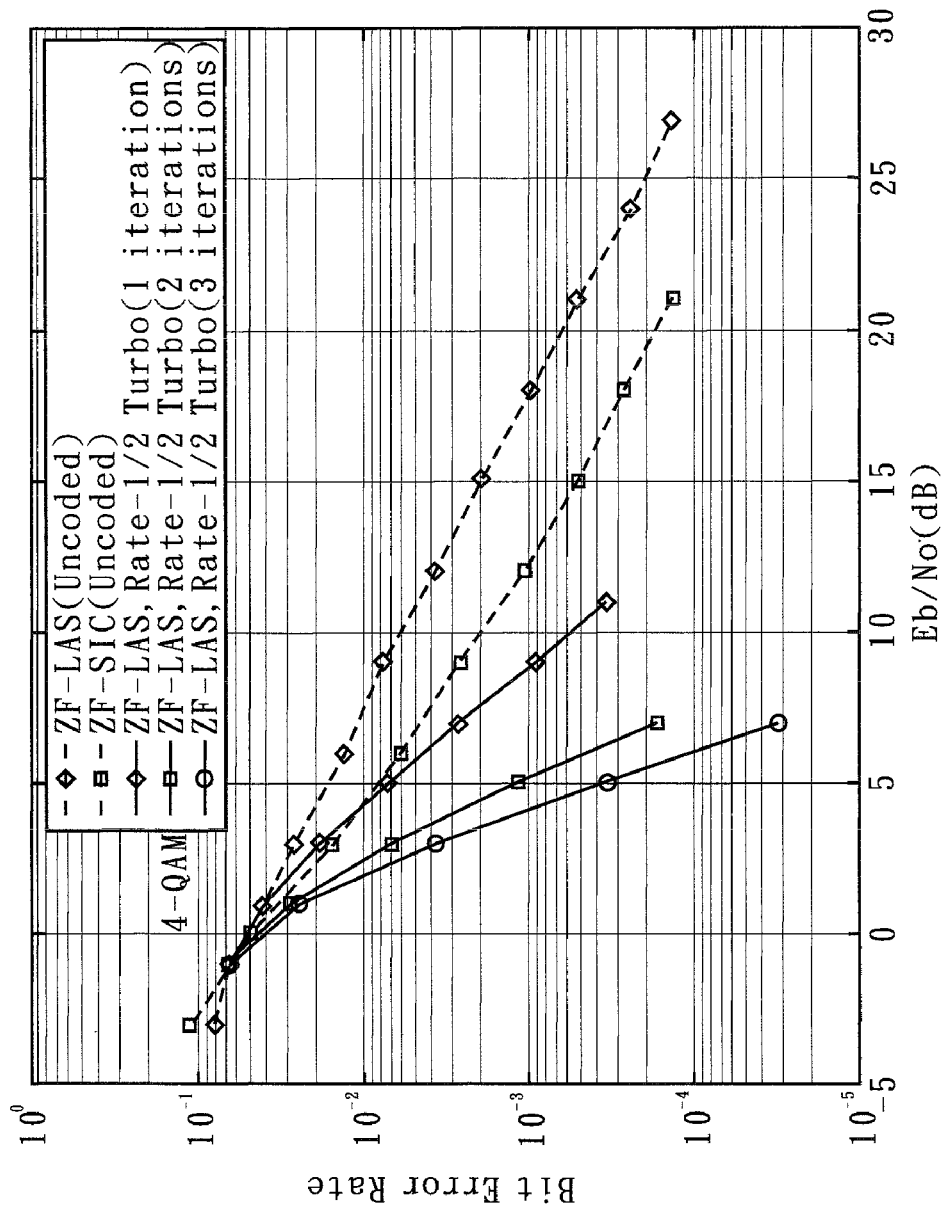

FIG. 6: shows coded BER performance of ZF-LAS as a function of $E_b/N_0$ for a 8×8 V-BLAST system with rate-½ turbo code and 4-QAM. Spectral efficiency: 8 bps/Hz for coded system and 16 bps/Hz for uncoded system. Number of turbo decoding iterations=1, 2, 3.

Figure 7:
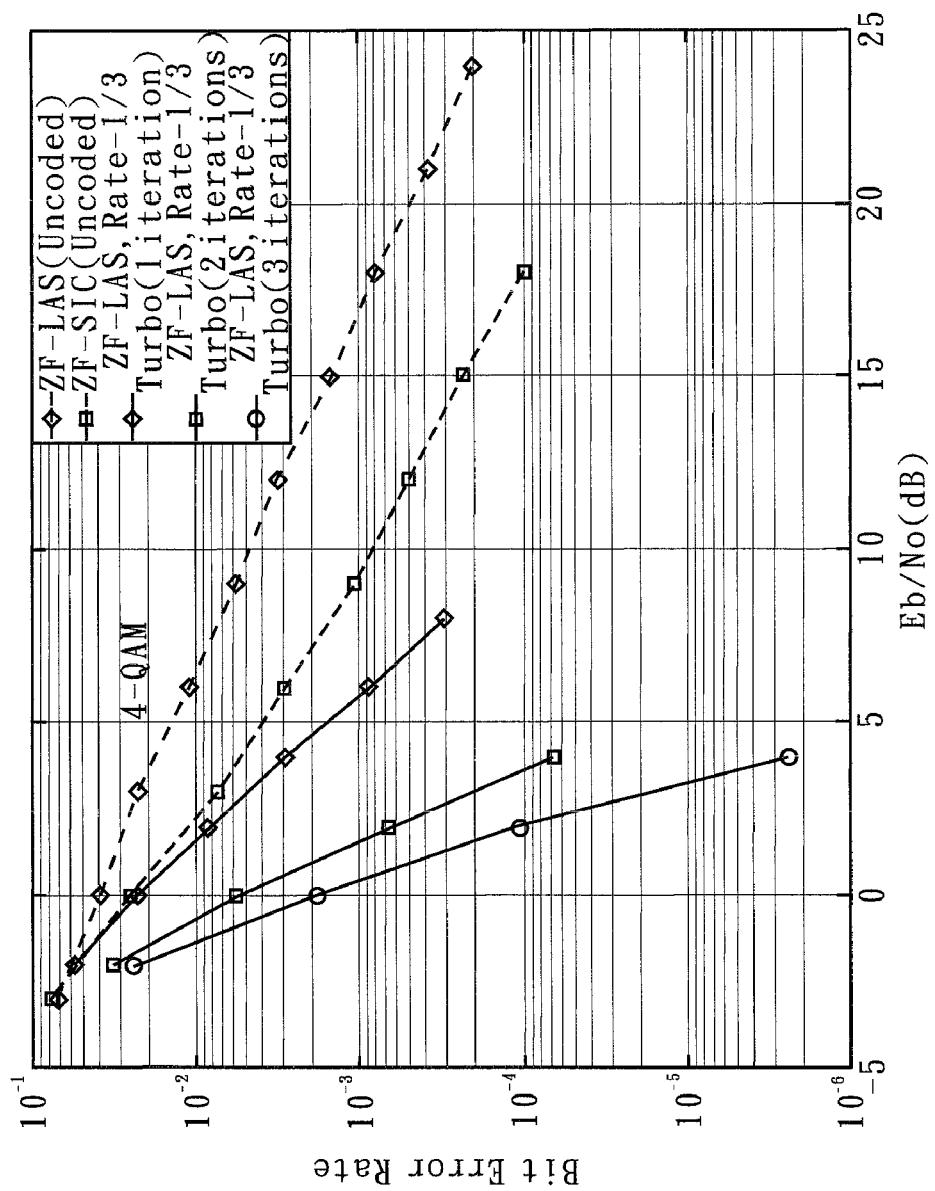

FIG. 7: shoes coded BER performance of ZF-LAS as a function of Eb/N0 for a 15×15 V-BLAST system with rate-⅓ turbo code and 4-QAM. Spectral efficiency: 10 bps/Hz for coded system and 30 bps/Hz for uncoded system. Number of turbo decoding iterations=1, 2, 3.

Figure 8:
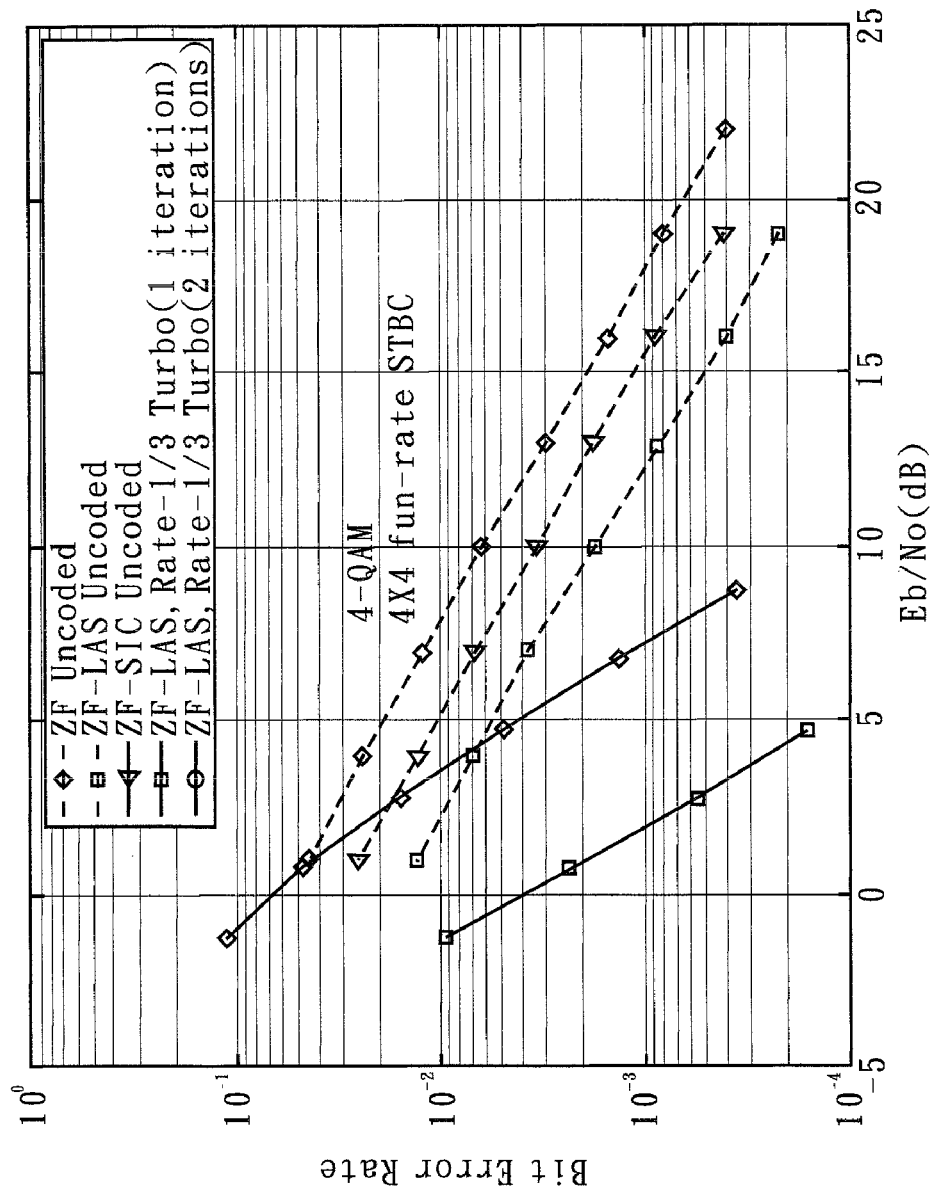

FIG. 8: shows coded BER performance of ZF-LAS for a 4×4 high-rate space-time block code from Division Algebra. Rate-4 STBC, rate-⅓ turbo code, 4-QAM. Number of turbo decoding iterations=1, 2, 3.

Figure 9:
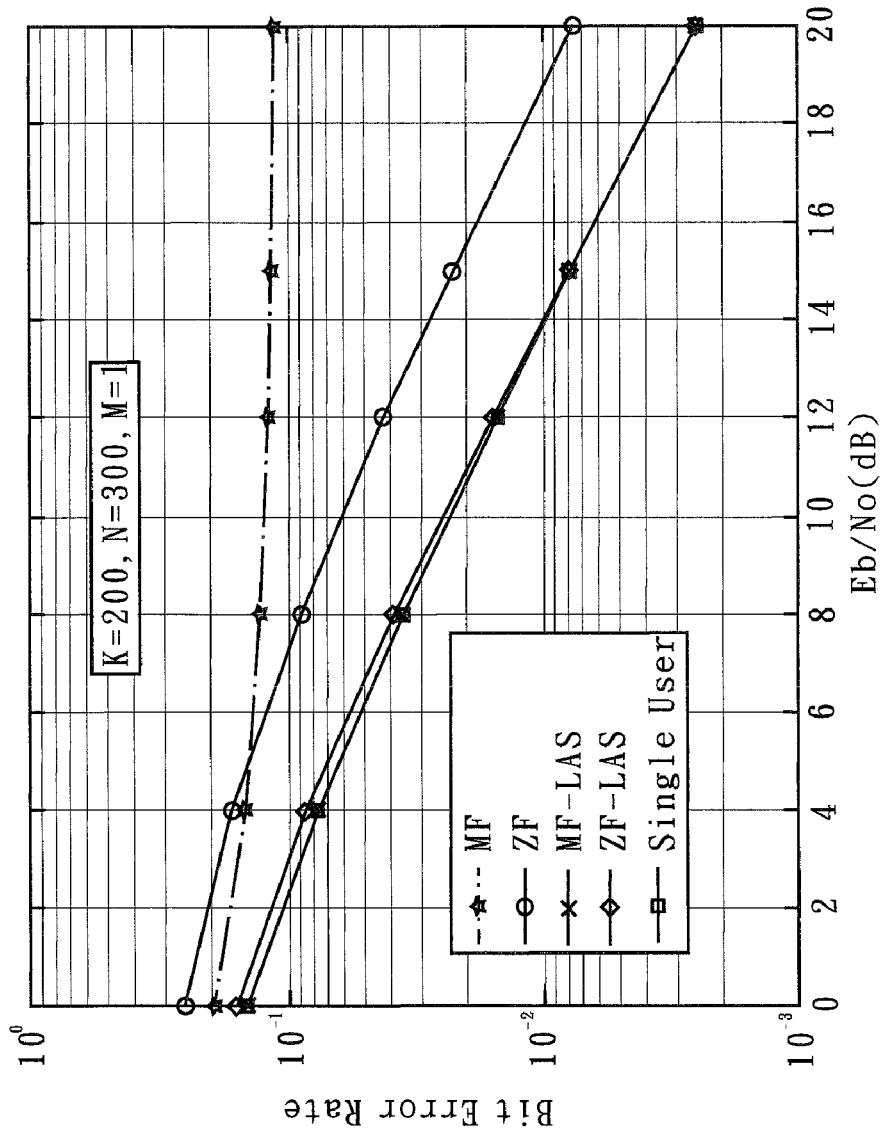

FIG. 9: shows BER performance of ZF-LAS and MF-LAS detectors as a function of average SNR for single carrier CDMA in Rayleigh fading. M=1, K=200, N=300, i.e., $\alpha$=⅔.

Figure 10:
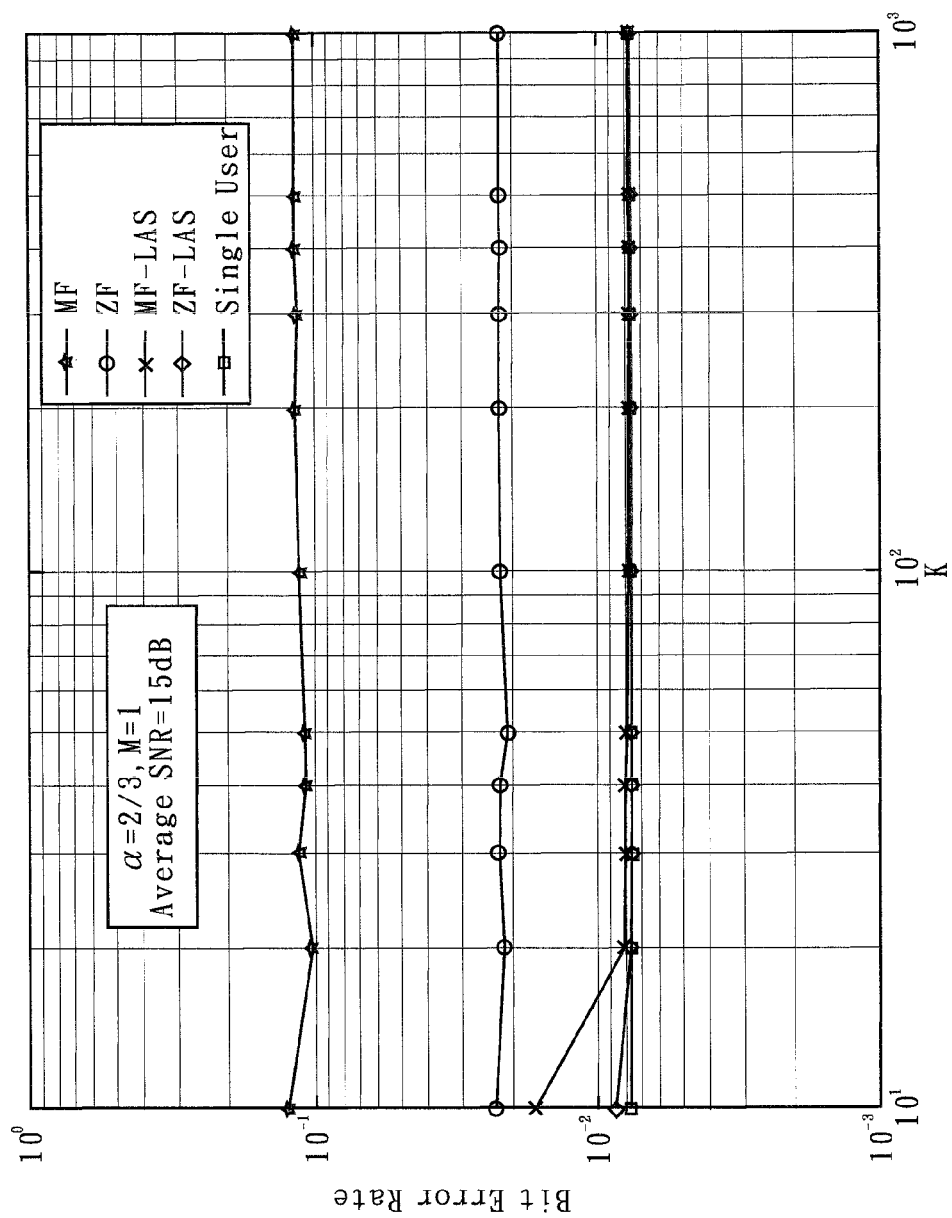

FIG. 10: shows BER performance of ZF-LAS and MF-LAS detectors as a function of number of users, K, for single carrier CDMA (M=1) in Rayleigh fading for a fixed $\alpha$=⅔ and average SNR=15 dB. N varied from 15 to 1500.

Figure 11:
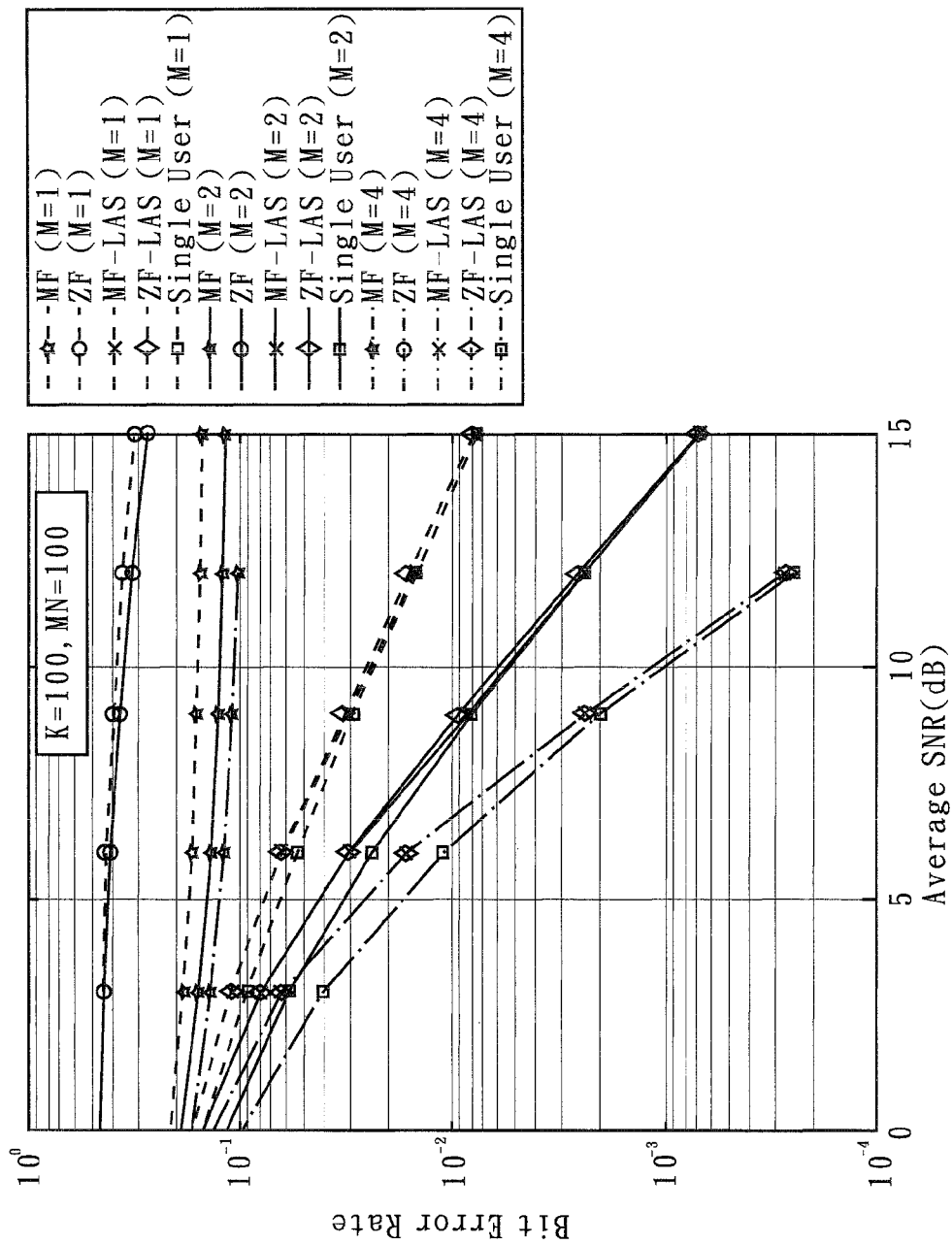

FIG. 11: shows BER performance of ZF-LAS and MF-LAS detectors as a function of average SNR for multicarrier CDMA in Rayleigh fading. M=1, 2, 4, $\alpha$=1, K=100, MN=100.

Figure 12:
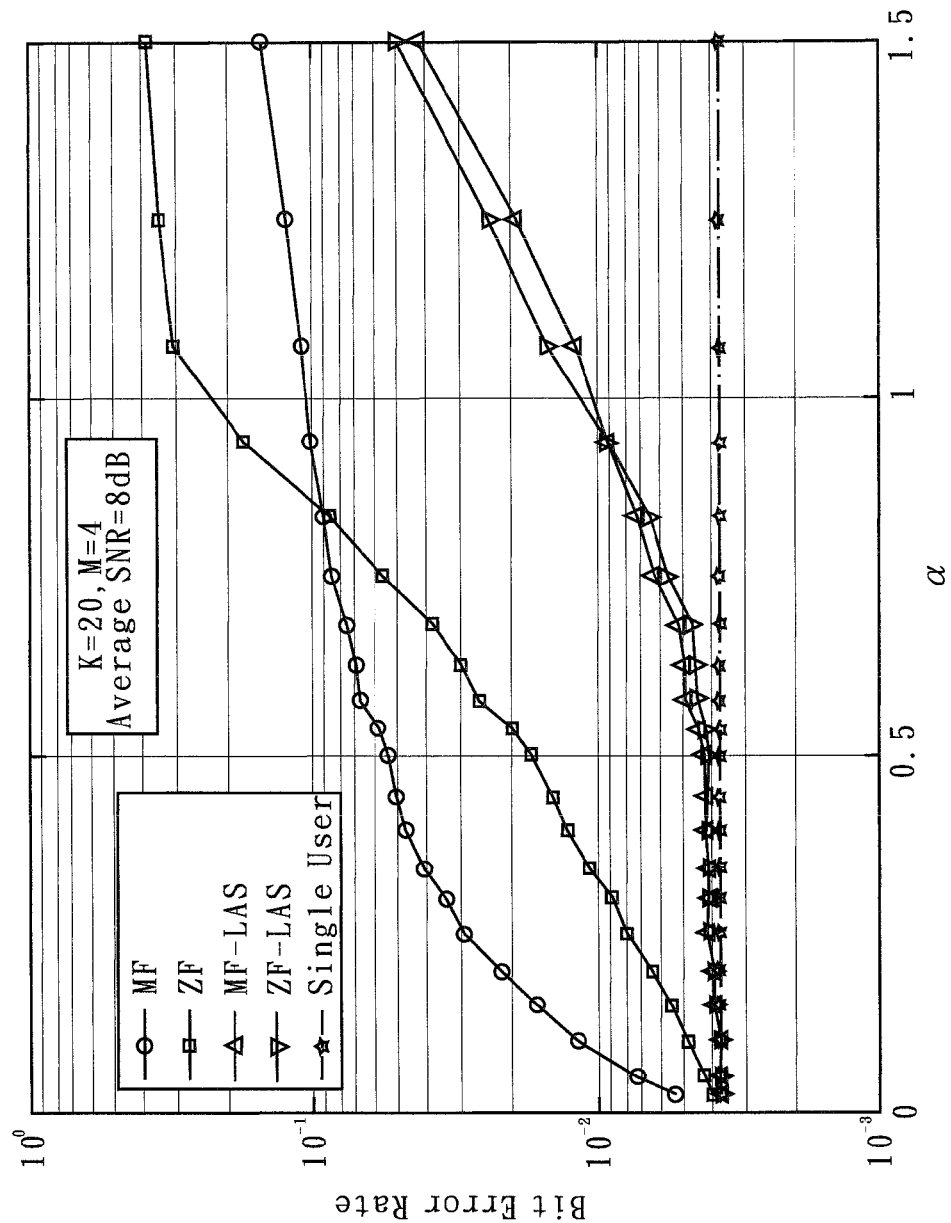

FIG. 12: shows BER performance of ZF-LAS and MF-LAS detectors as a function of loading fading factor, $\alpha$, for multicarrier CDMA in Rayleigh fading. M=4, K=30, N varied from 300 to 5, average SNR=8 dB.

Figure 13:
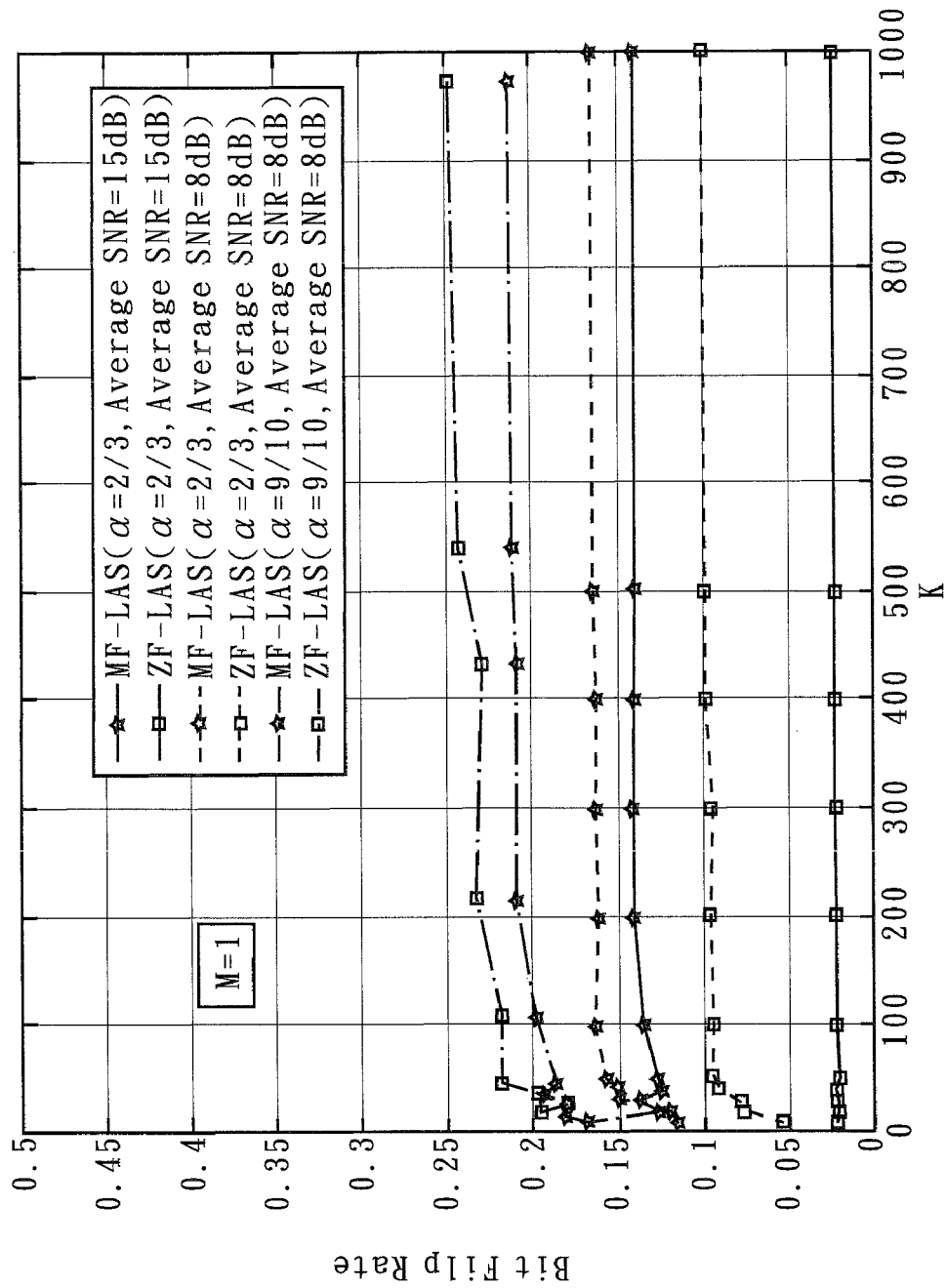

FIG. 13: shows bit flip rate of LAS operation as a function of number of users, K, for different values of average SNR and $\alpha$ for M=1.

Figure 14:
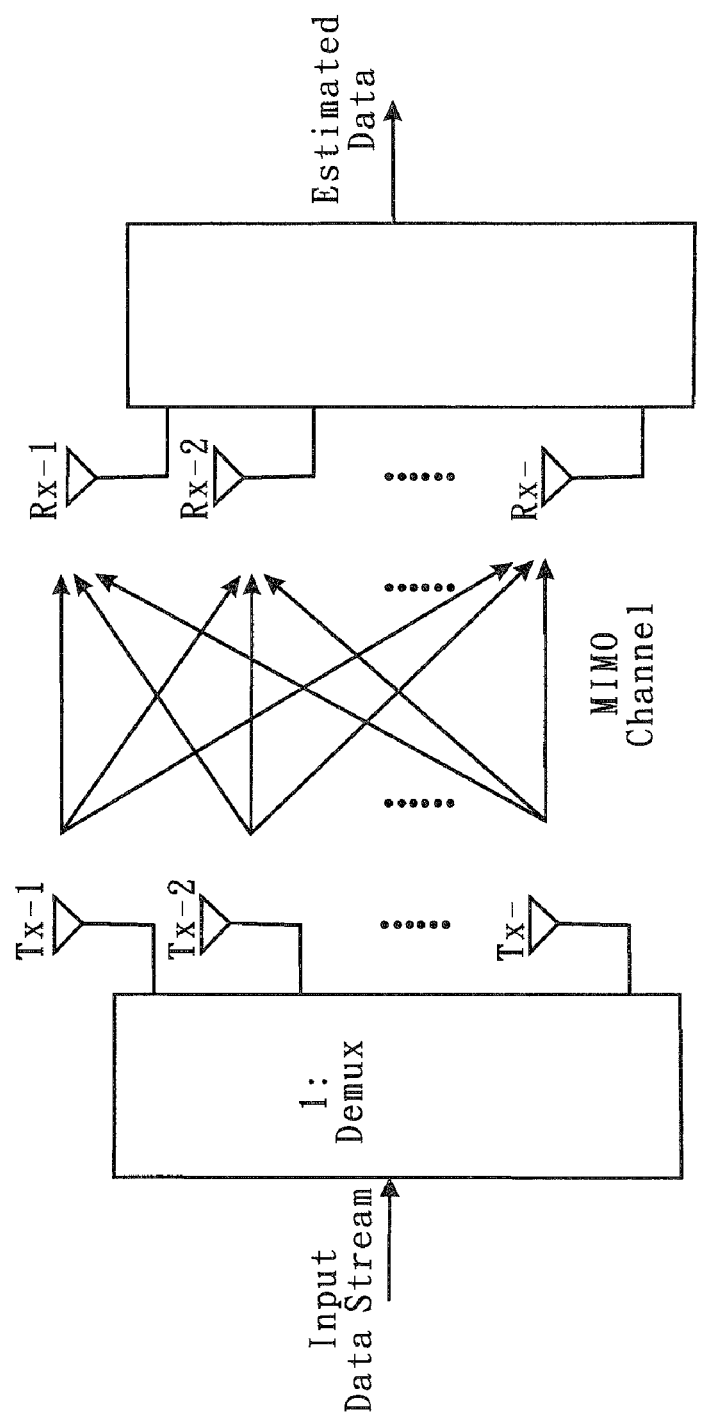

FIG. 14: shows a MIMO system

Figure 15:
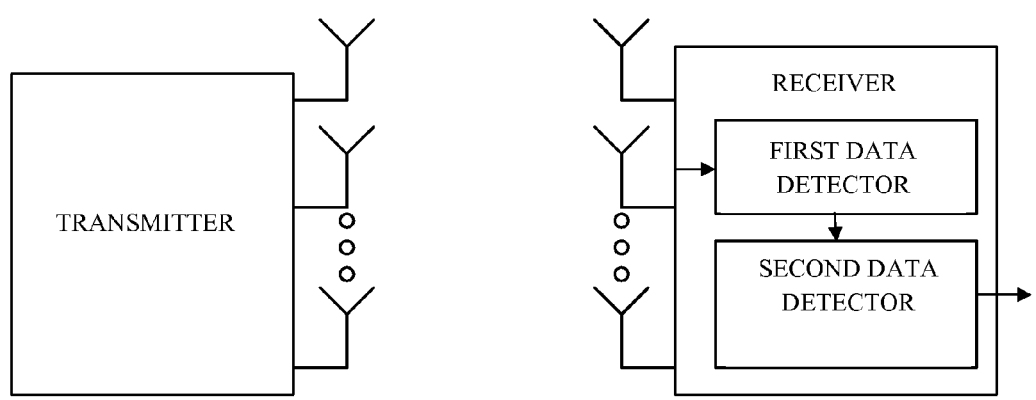

FIG. 15 shows the internal structure of the MIMO receiver.

DETAILED DESCRIPTION OF THE INVENTION

ZF-LAS Detector for V-BLAST
[We adopt the following notation throughout the document. Vectors are denoted by boldface lowercase letters, and matrices are denoted by boldface uppercase letters. $[.]^T$, $*$, and $[.]^H$ denote transpose, conjugate, and conjugate transpose operations, respectively. $\Re\{a\}$ and $\Im\{a\}$ denote the real and imaginary parts of a]

The primary embodiment of the invention is a method to detect data transmitted from multiple antennas, said method comprising steps of:
 i. selecting a starting data block and calling it as previous data block;
 ii. defining a set of indices of bits to be checked for possible flip in the previous data block as a check candidate set;
 iii. applying update rule to obtain updated data block using the previous data block and the check candidate set, wherein the update is made in such a manner that change in likelihood is positive;
 iv. checking if the updated data block and several consecutive previous data blocks are the same; if yes, declare the updated data block as the detected data block; if no, make updated data block as previous data block and go to step ii.

In yet another embodiment of the present invention the starting data block is either a random data block or an output data block from known detectors.

In still another embodiment of the present invention the sequence of check candidate set is chosen such that the bits are checked for possible flip in an order.

In still another embodiment of the present invention the order is circular or random.

In still another embodiment of the present invention the method provides for checking of multiple bits for possible flip.

In still another embodiment of the present invention the method of defining update rule comprise steps of,
 i. making $k^{th}$ bit +1 in $(n+1)^{th}$ step data block if $k^{th}$ bit of the $n^{th}$ step data block is −1 and gradient of likelihood function corresponding to the $k^{th}$ bit in the $n^{th}$ step data block is greater than a threshold corresponding to the $k^{th}$ bit in the $n^{th}$ step data block;
 ii. making $k^{th}$ bit −1 in $(n+1)^{th}$ step data block if $k^{th}$ bit of the $n^{th}$ step data block is +1 and gradient of likelihood function corresponding to the $k^{th}$ bit in the $n^{th}$ step data block is less than a threshold corresponding to the $k^{th}$ bit in the $n^{th}$ step; and
 iii. if conditions in (i) and (ii) are not satisfied the $k^{th}$ bit in $(n+1)^{th}$ step data block is kept same as $k^{th}$ bit value in the $n^{th}$ step data block.

In still another embodiment of the present invention the antennas in range of tens to thousands are used to transmit and to receive the data.

In still another embodiment of the present invention signals transmitted from the antennas occupy same transmission bandwidth using same modulation format of either BPSK or QPSK.

In still another embodiment of the present invention the method provides for low complexity detection with linear or quadratic complexity in multiple number of antennas.

In still another embodiment of the present invention the method provides for near maximum-likelihood (ML) performance for multiple antennas in the range of tens to thousands.

In still another embodiment of the present invention the method provides for spectral efficiencies of the order of tens to thousands of bps/Hz.

In still another embodiment of the present invention the method provides for spatial processing gain equal to the number of transmit antennas by exploiting the spatial dimensions without expanding the transmission bandwidth.

In still another embodiment of the present invention the method provides for reduction in $E_b$/No (Bit energy to noise spectral density ratio) by a factor of the number of transmit antennas without expanding the transmission bandwidth.

In still another embodiment of the present invention the method employs the data transmissions using higher order modulation format selected from a group comprising M-ary Quadrature Amplitude Modulation (M-QAM), M-ary Pulse Amplitude Modulation (M-PAM) and M-ary Phase Shift Keying (M-PSK).

In still another embodiment of the present invention the method detects data symbols transmitted from multiple transmit antennas using MIMO technique selected from a group comprising Space-Time Block Coding (STBC) and V-BLAST.

In still another embodiment of the present invention the method provides for detection in distributed/cooperative MIMO systems and networks with multiple number of co-operating nodes.

In still another embodiment of the present invention the method provides for detection in Ultra-wide band (UWB) systems with multiple users, multiple channel taps and multiple subcarriers.

In still another embodiment of the present invention the method provides for detection in underwater acoustic communications with multiple nodes deployed to sense and send information.

In still another embodiment of the present invention the method provides for detection in multi-user OFDM and MIMO-OFDM systems with multiple subcarriers.

In still another embodiment of the present invention the method provides for detection in outer-coded MIMO systems with out-code selected form group comprising turbo coding, LDPC coding, convolutional coding and block coding.

Another main embodiment of the present invention is a MIMO system comprising:
i. multiple transmit antennas for data transmission,
ii. multiple receive antennas for data reception
iii. a data detector using ZF/MF/MMSE/RV-LAS (zero-forcing/matched filter/minimum mean square error/random vector likelihood ascent search) to detect transmitted data, and
iv. a data detector which uses output data block from any known detector as the starting data block.

In yet another embodiment of the present invention the antennas are ranging from tens to thousands in number.

In still another embodiment of the present invention the system employs MIMO technique selected from a group comprising Space-Time Block Coding (STBC) and V-BLAST.

In still another embodiment of the present invention the system provides for low complexity detection with linear or quadratic complexity in multiple number of antennas.

In still another embodiment of the present invention the system provides for near maximum-likelihood (ML) performance for multiple antennas in the range of tens to thousands.

In still another embodiment of the present invention the system provides for spectral efficiencies of the order of tens to thousands of bps/Hz.

In still another embodiment of the present invention the system provides spatial processing gain equal to the number of transmit antennas by exploiting the spatial dimensions without expanding the transmission bandwidth.

In still another embodiment of the present invention the system provides for reduction in $E_b/N_0$ (Energy per bit to noise spectral density ratio) by a factor of the number of transmit antennas without expanding the transmission bandwidth.

In still another embodiment of the present invention the system employs the data transmissions using higher order modulation format selected from a group comprising M-ary Quadrature Amplitude Modulation (M-QAM), M-ary Pulse Amplitude Modulation (M-PAM) and M-ary Phase Shift Keying (M-PSK).

In still another embodiment of the present invention the system provides for detection in outer-coded MIMO systems with outer-code selected from a group comprising turbo coding, LDPC coding, convolutional coding and block coding.

Specifically, the invention provides for a low-complexity detector for large MIMO systems, including V-BLAST as well as high-rate, non-orthogonal space-time block codes (STBC). We show that this detector, termed as ZF-LAS (zero-forcing likelihood ascent search) MIMO detector, is much superior to other detectors in terms of both complexity as well as performance with large number of antennas.

The ZF-LAS MIMO detector in instant invention has its roots in past work on Hopfield neural network (HNN) based algorithms for image restoration [17]-[20], which are meant to handle large digital images (e.g., 512×512 image with 262144 pixels). In [21],[22], Sun applied his HNN based image restoration algorithms in [18]-[20] to multiuser detection (MUD) in CDMA systems on AWGN channels. This detector, referred to as the likelihood ascent search (LAS) detector, essentially searches out a sequence of bit vectors with monotonic likelihood ascent and converges to a fixed point in finite number of steps [21],[22]. The power of the LAS detector for CDMA lies in i) its linear average per-bit complexity in number of users, and ii) its ability to perform very close to Maximum likelihood (ML) detector for large number of users, which other suboptimum multiuser detectors do not possess [21],[22]. Taking the cue from LAS detector's complexity and performance superiority in large systems, we, in this invention, successfully adopt the LAS detector for large MIMO systems—both for V-BLAST as well as STBC systems [1],[2]—and report interesting results. While the adoption of HNN algorithms to CDMA MUD by Sun is a powerful development in MUD research, our contribution in this invention is a powerful development in MIMO detection. We also adopt the LAS detector for multicarrier (MC) CDMA in Rayleigh fading. We have carried out extensive simulations and evaluated the bit error performance and complexity of the ZF-LAS detector for large i) V-BLAST systems, ii) high-rate, non-orthogonal STBCs, and iii) MC CDMA systems.

Advantages of Instant Invention:

In terms of complexity and performance: The ZF-LAS detector has a significant complexity advantage over the well known V-BLAST detector (i.e., ZF-SIC with ordering, we use the term 'ZF-SIC' to always refer 'ZF-SIC with ordering') Specifically, ZF-SIC has a complexity of $O(N_t^2 N_r)$, whereas ZF-LAS has a complexity of only $O(N_t N_r)$, where $N_t$ and $N_r$ denote the number of transmit and receive antennas, respectively. This complexity advantage has great impact for large $N_t$, i.e., ZF-LAS allows practical detection of V-BLAST signals even for large number of antennas (of the order of thousands). The fact that we could show the simulation points of uncoded BER up to $10^{-5}$ in V-BLAST systems with several hundreds of antennas demonstrates the ZF-LAS detector's fantastic low-complexity attribute (which other known detectors have not been shown to possess). For large $N_t$, ZF-LAS not only has lesser complexity but also achieves much better diversity than ZF-SIC, which is a significant and interesting result. This practical detection feasibility could potentially trigger wide interest in the theory and implementation of large MIMO systems.

In terms of near-term applicability: Interestingly, even for a more near-term practical system like 8×8 V-BLAST system with 4-QAM and rate-½ outer turbo code (i.e., 8 bps/Hz spectral efficiency), ZF-LAS achieves a BER of $10^{-4}$ at an $E_b/N_0$ (Energy per bit to noise spectral density ratio) of 6 dB with 3 turbo decoding iterations. Likewise, a 15×15 V-BLAST system with 4-QAM and rate-⅓ outer turbo code (i.e., 10 bps/Hz spectral efficiency), ZF-LAS achieves a BER of $10^{-5}$ at an $E_b/N_0$ of just 3 dB with 3 turbo decoding iterations. The complexity involved with achieving similar performances using the well known ZF-SIC detector is comparatively very large.

We show that ZF-LAS is effective in decoding high-rate, non-orthogonal STBCs as well. A 4×4, rate-4 STBC [26] (i.e., 16 symbols sent in 4 time slots using 4 transmit antennas) with rate-⅓ turbo code is shown to achieve a BER of $10^{-4}$ at an $E_b/N_0$ of about 5 dB using ZF-LAS and just 2 turbo decoding iterations.

In MC CDMA, ZF-LAS detection achieves good performance for greater than one loading factors, whereas other MUDs including ZF/MMSE, PIC/SIC achieve relatively poor performance at such loading factors. With its superiority in performance and complexity for large number of users, MF-LAS can be a powerful approach to MUD implementations in practical CDMA systems.

In this section, we present the ZF-LAS detector for V-BLAST, its complexity and performance. Consider a V-BLAST system with $N_t$ transmit antennas and $N_r$ receive antennas, $N_t \geq N_r$, where $N_t$ symbols are transmitted from $N_t$ transmit antennas simultaneously. Let $b_k \in \{+1, -1\}$ be the symbol transmitted by the $k^{th}$ transmit antenna. Each transmitted symbol goes through the wireless channel to arrive at each of $N_r$ receive antennas. Denote the path gain from transmit antenna j to receive antenna k by $h_{kj}$. Considering a base-band discrete-time model for a flat fading MIMO channel, the signal received at antenna k, denoted by $y_k$, is given by $$y_k = \sum_{j=1}^{N_t} h_{kj} b_j + n_k. \quad (1)$$

The $\{h_{kj}\}$, $\forall \kappa \in \{1, 2, \ldots, N_r\}$, $\forall j \in \{1, 2, \ldots, N_t\}$, are assumed to be i.i.d. complex Gaussian r.v's (i.e., fade amplitudes are Rayleigh distributed) with zero mean and $E[(h_{kj}^I)^2] = E[(h_{kj}^Q)^2] = 0.5$, where $h_{kj}^I$ and $h_{kj}^Q$ are the real and imaginary parts of $h_{kj}$. The noise sample at the kth receive antenna, $n_k$, is assumed to be complex Gaussian with zero mean, and $\{n_k\}$, $k = 1, 2, \ldots, N_r$, are assumed to be independent with $$E[n_k^2] = N_0 = \frac{N_t E_s}{\lambda},$$

where Es is the average power of the transmitted symbols, and is the average receive SNR per receive antenna. Compactly2, collecting the received signals from all receive antennas, we write $$y = Hb + n, \quad (2)$$

where $y = [y_1 y_2 \ldots y_{N_r}]^T$ is the $N_r$-length received signal vector, $b = [b_1 b_2 \ldots b_{N_t}]^T$ is the $N_t$-length transmitted bit vector (bit vector is also represented as data block), H denotes the $N_r \times N_t$ channel matrix with channel coefficients $\{h_{kj}\}$, and $n = [n_1 n_2 \ldots n_{N_r}]^T$ is the $N_r$-length noise vector. H is assumed to be known perfectly at the receiver, but not at the transmitter.

ZF-LAS for V-BLAST: Method

In the following, we obtain the ZF-LAS detector for the V-BLAST system considered in the above. The ZF-LAS detector essentially searches out a sequence of bit vectors; this sequence is decided based on an update rule, until a fixed point is reached. In the V-BLAST system considered, for ML detection [14], the most likely b is taken as that b which maximizes $$\Lambda(b) = b^T H^H y + b^T (H^H y)^* - b^T H^H H b, \quad (3)$$

The likelihood function in (3) can be written as $$\Lambda(b) = b^T y_{veff} - b^T H_{veff} b, \quad (4)$$

Where $$y_{veff} = H^H y + (H^H y)^*, \quad (5)$$

$$H_{veff} = H^H H. \quad (6)$$

Update Criterion in the Search Procedure: Let b(n) denote the bit vector tested by the LAS procedure in the search step n. The starting vector b(0) can be either a random vector, or the output vector from any known detector. When the output vector of the ZF detector is taken as the b(0), we call the resulting LAS detector as the ZF-LAS detector. We define matched filter LAS (MF-LAS) detector also likewise, i.e., the MF detector output vector is taken as the b(0). Given b(n), the LAS procedure obtains b(n+1) through an update rule until reaching a fixed point. The update is made in such a way that the change in likelihood from step n to n+1, denoted by $\Delta\Lambda(b(n))$, is always positive, i.e., $$\Delta\Lambda(b(n)) \underline{\Delta} \Lambda(b(n+1)) - \Lambda(b(n)) \geq 0. \quad (7)$$

An expression for the above change in likelihood can be obtained in terms of the gradient of the likelihood function as follows. Let g(n) denote the gradient of the likelihood function evaluated at b(n), i.e., $$g(n) \underline{\underline{\Delta}} \frac{\partial(\Lambda(b(n)))}{\partial(b(n))} = y_{veff} - H_{vreal} b(n), \quad (8)$$

Where $$H_{vreal} = H_{veff} + (H_{veff})^* = 2 \Re \{H_{veff}\}, \quad (9)$$

Using (4) in (7), we can write $$\Delta\Lambda(b(n)) = b^T(n+1) y_{veff} - b^T(n+1) H_{veff} b(n+1) - \quad (10)$$
$$(b^T(n) y_{veff} - b^T(n) H_{veff} b(n))$$
$$= (b^T(n+1) - b^T(n))(y_{veff} - H_{vreal} b(n)) -$$
$$(b^T(n+1) - b^T(n))(-H_{vreal} b(n)) -$$
$$b^T(n+1) H_{veff} b(n+1) + b^T(n) H_{veff} b(n).$$

Now, defining $$\Delta b(n) \underline{\Delta} b(n+1) - b(n) \quad (11)$$

and i) observing that $b^T(n) H_{vreal} b(n) = 2 b^T(n) H_{veff} b(n)$, ii) adding & subtracting the term $$\frac{1}{2} b^T(n) H_{vreal} b(n+1)$$

to the RHS of (10), and iii) further observing that $b^T(n) H_{vreal} b(n+1) b^T(n+1) H_{vreal} b(n)$ we can simplify (10) as $$\Delta\Lambda(b(n)) = \Delta b^T(n)(y_{veff} - H_{vreal} b(n)) - \frac{1}{2} \Delta b^T(n) H_{vreal} \Delta b(n) \quad (12)$$
$$= \Delta b^T(n)\left(g(n) + \frac{1}{2} z(n)\right),$$

Where $$z(n) = -H_{vreal} \Delta b(n). \quad (13)$$

Now, given $y_{veff}$, $H_{veff}$, and b(n), the objective is to obtain b(n+1) from b(n) such that $\Delta\Lambda(b(n))$ in (12) is positive. Potentially any one or several bits in b(n) can be flipped (i.e., changed from +1 to −1 or vice versa) to get b(n+1). We refer to the set of bits to be checked for possible flip in a step as a check candidate set. Let $L(n) \subset \{1, 2, \ldots, K\}$ denote the check candidate set at step n. With the above definitions, it can be seen that the likelihood change at step n, given by (12), can be written as $$\Delta\Lambda(b(n)) = \sum_{k \in L(n)} \Delta b_k(n) \left[ g_k(n) + \frac{1}{2} g_k(n) \right], \quad (14)$$

Where $b_k(n)$, $g_k(n)$ and $z_k(n)$ are the kth elements of the vectors b(n), g(n), and z(n), respectively. As shown in [21], [22] for single carrier CDMA on AWGN, the following update rule can be easily shown to achieve monotonic likelihood ascent (i.e., $\Delta\Lambda(b(n))>0$ if there is at least one bit flip) in the V-BLAST system as well.

LAS Update Procedure: Given $L(n) \subset \{1, 2, \ldots, K\}$, $\forall n \geq 0$ and an initial bit vector (for ZF-LAS detector, initial vector for the method is taken to be the ZF detector output vector) $b(0) \in \{-1, +1\}^k$, bits in b(n) are updated as per the following update rule:

$$b_k(n+1) = \begin{cases} +1, & \text{if } k \in L(n), \; b_k(n) = -1 \text{ and } g_k(n) > t_k(n), \\ -1, & \text{if } k \in L(n), \; b_k(n) = +1 \text{ and } g_k(n) < -t_k(n), \\ b_k(n), & \text{otherwise,} \end{cases} \quad (15)$$

where $t_k(n)$ is a threshold for the kth bit in the nth step, which, similar to the threshold in [21],[22], is taken to be $$t_k(n) = \sum_{j \in L(n)} |(H_{vreal})_{kj}|, \; \forall k \in L(n), \quad (16)$$

where $(H_{vreal})_{kj}$ is the element in the $k^{th}$ row and $j^{th}$ column of the matrix $H_{vreal}$. It can be shown, as in [21],[22], that $t_k(n)$ in (16) is the minimum threshold that ensures monotonic likelihood ascent.

It is noted that different choices can be made to specify the sequence of L(n), $\forall n \geq 0$. One of the simplest sequences correspond to checking one bit in each step for a possible flip, which is termed as a sequential LAS (SLAS) algorithm with constant threshold, $t_k = |(H_{vreal})_{k,k}|$. The sequence of L(n) in SLAS can be such that the indices of bits checked in successive steps is chosen circularly or randomly. Checking of multiple bits for possible flip is also possible. Let $L_f(n) \subset L(n)$ denote the set of indices of the bits flipped according to the update rule in (15) at step n. Then the updated bit vector b(n+1) can be written as $$b(n+1) = b(n) - 2 \sum_{i \in L_f(n)} b_i(n) e_i, \quad (17)$$

where $e_i$ is the $i^{th}$ coordinate vector. Using (17) in (8), the gradient vector for the next step can be obtained as $$g(n+1) = y_{veff} - H_{vreal} b(n+1) \quad (18)$$
$$= g(n) + 2 \sum_{i \in L_f(n)} b_i(n) (H_{vreal})_i,$$

where $(H_{vreal})_i$ denotes the $i^{th}$ column of the matrix $H_{vreal}$. The LAS method keeps updating the bits in each step based on the update rule given in (15) until $b(n) = b_{fp}$, $\forall n \geq n_{fp}$ for some $n_{fp} \geq 0$, in which case $b_{fp}$ is a fixed point, and it is taken as the detected bit vector and the algorithm terminates.

ZF-LAS for V-BLAST: Complexity

In terms of complexity, given an initial vector, the LAS operation part alone has an average per-bit complexity of $O(N_t N_r)$. This can be explained as follows. The complexity involved in the LAS operation is due to two components: i) initial computation of g(0) in (8), which requires $O(N_t N_r)$ complexity per bit, and ii) update of g(n) as per (18), which requires $O(N_t)$ complexity whenever there is a flip in a given step. So the total average per-bit complexity in ii) in the above is determined by the average number of flips per bit, referred to as the bit flip rate. From simulations (which will be shown in MC CDMA results), we find that these flip operations have constant average per-bit complexity c, where the constant c depends on SNR, $N_t$, $N_r$, and the initial vector b(0). So, putting the complexities of i) and ii) in the above together, we see that the average per-bit complexity of LAS operation alone in ZF/MF-LAS is $O(N_t N_r)$. Also, the initial vector generation using ZF detector has a complexity of $O(N_t N_r)$, and the initial vector generation using MF detector has a complexity of $O(N_r)$. So, the overall average per-bit complexity of ZF/MF-LAS detectors for V-BLAST is $O(N_t N_r)$. This is in contrast with the well known ZF-SIC detector for V-BLAST whose per-bit complexity is $O(N_t^2 N_r)$. Thus, ZF-LAS enjoys a clear complexity advantage over ZF-SIC by an order of Nt. Thus, while the ZF-SIC becomes prohibitively complex for large number of antennas of the order of hundreds, the low-complexity attribute makes ZF-LAS practically viable. To illustrate this point, in the following subsection, we will present the simulation plots of ZF-LAS for up to 400×400 V-BLAST systems up to $10^{-5}$ uncoded BER (obtained within few hours of simulation run time), whereas simulation points for ZF-SIC for such large number of antennas were found to require several days of simulation run time (because of which ZF-SIC performance results for up to 400 antenna systems are not given).

ZF-LAS for V-BLAST: Performance Results & Discussions

In this subsection, we present the performance results of ZF-LAS for V-BLAST obtained through extensive simulations, and compare with those of other known detectors. The LAS procedure used is the SLAS with circular checking of bits starting from the first user's bit. The major comparison we draw is between the ZF-LAS detector and the ZF-SIC detector (which is the well known V-BLAST detector [15], [16]). In addition, we also present the comparison with other detectors including the MF detector, ZF detector, and MF-LAS detector, where ever appropriate. Since ZF and ZF-SIC detectors are good representative candidates for comparison with ZF-LAS, we do not present the performance comparison with other detectors like MMSE, PIC, SIC, MMSE-SIC explicitly. For example, a performance and complexity comparison between MMSE-LAS (where MMSE detector output is taken as the LAS's initial vector) and MMSE-SIC will be similar to that between ZF-LAS and ZF-SIC.

Initially, in FIGS. 1 to 5 we present the uncoded BER performance of various detectors, where we illustrate the superiority of ZF-LAS detector in terms of both complexity and performance in large V-BLAST systems. Next, in FIGS. 6 to 7, we present the coded BER performance with turbo code, where we illustrate the advantage of ZF-LAS in more near-term practical V-BLAST systems with 8×8 and 15×15 antennas. In FIG. 8, we present the coded BER performance of ZF-LAS detector for high-rate, non-orthogonal STBC.

Uncoded BER Performance

Effect of increasing $N_r$ for a fixed $N_t$: In FIG. 1, we present the uncoded BER performance of ZF-LAS as a function of average SNR per receive antenna, Y(dB), for MF, ZF, and ZF-LAS detectors for three different cases, namely, 10×10 ($N_t=N_r=10$), 10×11 ($N_t=10,N_r=11$), and 10×12 ($N_t=N_r=12$) V-BLAST systems with BPSK modulation. This figure illustrates the effect of increasing the number of receive antennas for a given number of transmit antennas. As expected, ZF-LAS performs better than ZF and picks up the receive diversity offered by the increased number of receive antennas.

ZF-LAS performs increasingly better than ZF-SIC for increasing $N_t=N_r$: In FIG. 2, we plot the BER performance ZF-LAS and ZF-SIC detectors for V-BLAST as a function of $N_t=N_r$ at an average SNR of 20 dB. The performance of MF, ZF, and MF-LAS detectors are also plotted for comparison. From FIG. 2, we can observe that, ZF-LAS performs slightly better than ZF-SIC for antennas less than 4. But ZF-SIC performs better than ZF-LAS for antennas in the range 4 to 25. Beyond 25 antennas, however, ZF-LAS performs increasingly better than ZF-SIC for increasing $N_t=N_r$. We found this cross-over point to be different for different SNRs. A general behavior, however, we observed is that (which is in line with the observation/results reported in [21],[22]), ZF-LAS performs very well in a large system setting (large number of antennas in our case, whereas it was large number of users in [21],[22]). Another interesting behavior in FIG. 2 is that for antennas greater than 50, MF-LAS performs better than ZF-LAS. This behavior can be explained by observing the performance comparison between MF and ZF detectors given in the same figure. For more than 50 antennas, MF performs better than ZF. Hence, starting with a better initial vector, MF-LAS performs better than ZF-LAS. ZF detector's poorer performance compared to MF detector in high interference conditions (here high interference due to large $N_t$) and high noise conditions (see MF vs ZF performance in FIG. 3) is well known in the literature [14].

ZF-LAS outperforms ZF-SIC in large V-BLAST systems both in complexity & diversity: In FIG. 3, we present an interesting comparison of the uncoded BER performance between ZF, ZF-LAS and ZF-SIC, as a function of average SNR for a 200×200 V-BLAST system. This system being a large system, the ZF-LAS has a huge complexity advantage over ZF-SIC as pointed out before. In fact, although we have taken the effort to show the performance of ZF-SIC at such a large number of antennas like 200, we had to obtain these simulation points for ZF-SIC over days of simulation time, whereas the same simulation points for ZF-LAS were obtained in just few hours. This is due to the $O(N_tN_r)$ complexity of ZF-SIC versus $O(N_tN_r)$ complexity of ZF-LAS, as pointed out before. More interestingly, in addition to this lesser complexity advantage, ZF-LAS is able to achieve much higher order of diversity in BER performance compared to ZF-SIC. This is clearly evident from the slopes of the BER curves of ZF-LAS and ZF-SIC. This complexity as well as diversity order advantage of ZF-LAS over ZF-SIC is clearly very valuable.

ZF-LAS performance with hundreds of antennas: As pointed out in the above, obtaining ZF-SIC results for more than even 50 antennas requires very long simulation run times, which is not the case with ZF-LAS. In fact, we could easily generate BER results for antennas up to 400 for ZF-LAS, which are plotted in FIG. 4. The key observations here are that i) the average SNR required to achieve a certain BER performance keeps reducing for increasing number of antennas for ZF-LAS, and ii) increasing the number of antennas results in increased orders of diversity achieved. Observation i) in the above is explicitly brought out in FIG. 5, where we have plotted the average SNR required to achieve a target uncoded BER of $10^{-3}$, as a function of $N_t=N_r$ for ZF-LAS and ZF-SIC.

It can be seen that the SNR required to achieve $10^{-3}$ with ZF-LAS significantly reduces for increasingly large $N_t=N_r$. For example, this required SNR reduces from about 25 dB for a SISO system to about 7 dB for a 400×400 V-BLAST system using ZF-LAS.

Turbo Coded BER Performance

While the practical realization of MIMO systems with large number of antennas could be far away into the future because of various other system level issues, including the issue of placing several antennas in small-sized communication terminals, we looked at the practicality and benefit of ZF-LAS in MIMO systems which could be of practical interest in the near-term. Towards that end, we considered 8×8 and 15×15 V-BLAST systems, by noting that practical 8 antenna systems are being talked about [27]. We point out that for number of antennas up to about 30, ZF-SIC has been found to perform better than ZF-LAS (see FIG. 2). So, for the 8×8 and 15×15 systems, there is no performance gain in favor of ZF-LAS compared to ZF-SIC. However, there is a substantial complexity gain that is achieved with ZF-LAS over ZF-SIC. We highlight this point by pointing to our observation that the complexity (in terms of simulation run time) of an uncoded 8×8 ZF-SIC is about the same as a rate-½ turbo coded 8×8 ZF-LAS with 3 turbo decoding iterations. In FIG. 6, we present the uncoded as well as the rate-½ turbo coded BER performance as a function of $E_b/N_0$ for the 8×8 system using 4-QAM modulation (i.e., 8 bps/Hz spectral efficiency). FIG. 7 presents similar plots for the 15×15 system with rate-⅓ turbo code and 4-QAM (10 bps/Hz spectral efficiency). Interestingly, in the rate-½ turbo coded 8×8 V-BLAST system, ZF-LAS achieves a BER of $10^{-4}$ at an $E_b/N_0$ of 6 dB with 3 turbo decoding iterations. Likewise, in the rate-⅓ turbo coded 15×15 V-BLAST system, ZF-LAS achieves a BER of $10^{-5}$ at an $E_b/N_0$ of just 3 dB with 3 turbo decoding iterations. The complexity involved with achieving similar performances using the well known ZF-SIC detector along with turbo decoding is comparatively very large.

The present invention for V-BLAST multi-antenna systems have the following characteristics:
  the present invention achieves both complexity gain as well as performance gain compared to a well known MIMO detector in prior art (i.e., ZF-SIC) when the number of antennas is more than 20. This can be seen from the performance cross-over at the 20 antennas pointing FIG. 1.
  when number of antennas is less than 20, the present invention achieves only complexity gain compared to prior-art MIMO detector. The performance of prior art MIMO detector is better when the number of antennas is small, i.e., less than 20 (see FIG. 1).
  The present invention achieves near-ML performance only for large number of antennas. Typically near-ML performance is achieved for more than 60 antennas (see FIG. 1).
Placement of tens or hundreds of antennas in communication terminals is a challenge when the communication terminals are small in size. This would require a high carrier frequency operation, i.e., small carrier wavelengths for $\lambda/2$ separation to ensure independence between antennas. Communication terminals of reasonable size (e.g., laptops, etc.) can have tens of antennas (e.g., 32 or 64 antennas) using which the present invention can achieve ML performance. Fixed communication terminals in indoor environments can have even higher number of antennas. Also, a much larger number of antennas can be embedded in the body of vehicles in moving platform applications (e.g., cars, trucks, tanks, jeeps, autonomous under water vehicles in under water acoustic communications, etc.).

Since the high-rate STBC multi-antenna approach would require less number of antennas compared to V-BLAST multi-antenna approach, the antenna placement issue can be alleviated by the use of high-rate STBC approach.

In V_BLAST, the number of receive antennas must be greater than or equal to number of transmit antennas.

Accurate channel estimation at the receiver is a requirement in the proposed invention.

ZF-LAS for High-Rate STBCs

Since the placement of several antennas can be an issue in small-sized communication terminals, high-rate space time codes can be used instead of pure V-BLAST; the advantages of the space-time codes approach being i) less number of antennas, and ii) transmit diversity. Since multiple time slots are involved in the space-time approach, additional decoding delay would be involved compared to V-BLAST. Low-complexity decoding of high-rate, non-orthogonal space-time block codes (STBC) is a challenge. Here, we show that high-rate, non-orthogonal STBCs can be easily decoded using ZF-LAS while achieving good performance. Explicit construction of high-rate, full-diversity, non-orthogonal STBCs have been discussed in detail in [26]. An n×n STBC is said to be of full-rate, if there are $n^2$ variables in it, or, equivalently, the rate of the code is n complex symbols per channel use. An example of a full-rate, full-diversity STBC for 4 antennas is shown below [26]:

$$S = \begin{bmatrix} s_{11} & s_{12} & s_{13} & s_{14} \\ s_{21} & s_{22} & s_{23} & s_{24} \\ s_{31} & s_{32} & s_{33} & s_{34} \\ s_{41} & s_{42} & s_{43} & s_{44} \end{bmatrix}. \quad (19)$$

where the $\{s_{ij}\}$, $i,j \in \{1,2,34\}$ are given in the Appendix. A detailed discussion on such codes for arbitrary number of antennas can be seen in [26]. The best known decoding algorithms which extract the full-diversity property of these codes are the sphere-decoding and MCMC algorithms [12],[13], which are not practical when the number of antennas exceed 10 for the use of QAM constellation. With ZF-LAS, however, we show that such high-rate, non-orthogonal STBCs can be easily decoded while achieving good performance as well. FIG. 8 shows the uncoded as well as rate-⅓ turbo coded BER performance of ZF-LAS in decoding the rate-4, non-orthogonal STBC4 from division algebra given by (19). This STBC in 919) sends 16 symbols in 4 time slots using 4 transmit antennas. From FIG. 8, we can observe that a coded BER of $10^{-4}$ is achieved at about 5 dB $E_b/N_0$ using ZF-LAS and 2 iterations of turbo decoding.

ZF-LAS Detector for Multicarrier CDMA

In this section, we present the ZF-LAS detector for multicarrier CDMA, its performance and complexity. Consider a K-user synchronous multicarrier DS-CDMA system with M subcarriers. Let $b_k \in \{+1,-1\}$ denote the binary data symbol of the kth user, which is sent in parallel on M subcarriers [23], [24]. Let N denote the number of chips-per-bit in the signature waveforms. It is assumed that the channel is frequency non-selective on each subcarrier and the fading is slow (assumed constant over one bit interval) and independent from one subcarrier to the other.

Let $y^{(i)} = [y_1^{(i)} y_2^{(i)} \ldots y_K^{(i)}]^T$ denote the K-length received signal vector on the $i^{th}$ subcar-rier; i.e. $y_k^{(i)}$ is the output of the $k^{th}$ user's matched filter on the ith subcarrier. Assuming that the inter-carrier interference is negligible, the K-length received signal vector on the $i^{th}$ subcarrier y(i) can be written in the form $$y^{(i)} = R^{(i)} H^{(i)} A b + n^{(i)}, \quad (20)$$

where R(i) is the K×K cross-correlation matrix on the $i^{th}$ subcarrier, given by $$R^{(i)} = \begin{bmatrix} 1 & \rho_{12}^{(i)} & \cdots & \rho_{1K}^{(i)} \\ \rho_{21}^{(i)} & 1 & \cdots & \rho_{2K}^{(i)} \\ \vdots & \vdots & \ddots & \vdots \\ \rho_{K1}^{(i)} & \rho_{K2}^{(i)} & \cdots & 1 \end{bmatrix}, \quad (21)$$

where $p_{lj}^{(i)}$ is the normalized cross correlation coefficient between the signature waveforms of the $l^{th}$ and $j^{th}$ users on the ith subcarrier. $H^{(i)}$ represents the K×K channel matrix, given by $$H^{(i)} = \text{diag}\{h_1^{(i)}, h_2^{(i)}, \ldots, h_K^{(i)}\}, \quad (22)$$

where the channel coefficients $h_k^{(i)}$, i–1, 2, ..., M, are assumed to be i.i.d. complex Gaussian r.v's (i.e., fade amplitudes are Rayleigh distributed) with zero mean and $E[(h_{kI}^{(i)})^2] = E[(h_{kQ}^{(i)})^2] = 0.5$, where $h_{kI}^{(i)}$ and $h_{kQ}^{(i)}$ are the real and imaginary parts of h(i) k. The K-length data vector b is given by $$b = [b_1 b_2 \ldots b_k]^T, \quad (23)$$

and the K×K diagonal amplitude matrix A is given by $$A = \text{diag}\{A_1, A_2, \ldots, A_K\}, \quad (24)$$

where $A_k$ denotes the transmit amplitude of the $k^{th}$ user. The K-length noise vector $n^{(i)}$ is given by $$n^{(i)} = [n_1^{(i)} n_2^{(i)} \ldots n_K^{(i)}]^T, \quad (25)$$

where $n_k^{(i)}$ denotes the additive noise component of the $k^{th}$ user on the $i^{th}$ subcarrier, which is assumed to be complex Gaussian with zero mean with $E[n_k^{(i)}(n_j^{(i)})^*] = \sigma^2$ when j=k and $E[n_k^{(i)}(n_j^{(i)})^*] = \sigma^2 p_{kj}^{(i)}$ when j≠k. We assume that all the channel coefficients are perfectly known at the receiver.

ZF-LAS for MC CDMA: Algorithm

We note that once the likelihood function for the MC CDMA system in the above is obtained, then it is straightforward to adopt the ZF-LAS algorithm for MC CDMA. Accordingly, in the multicarrier system considered, the most likely b is taken as that b which maximizes $$\Lambda(b) = \sum_{i=1}^{M} (b^T A(H^{(i)})^* y^{(i)} + b^T A H^{(i)}(y^{(i)})^*) - b^T \left(\sum_{i=1}^{M} A H^{(i)} R^{(i)} (H^{(i)})^* A\right) b. \quad (26)$$

The likelihood function in (26) can be written in a form similar to Eqn. (4.11) in [14] as $$\Lambda(b) = b^T A y_{ceff} - b^T H_{ceff} b, \quad (27)$$

Where $$y_{ceff} = \sum_{i=1}^{M} ((H^{(i)})^* y^{(i)} + H^{(i)}(y^{(i)})^*), \quad (28)$$

$$H_{ceff} = \sum_{i=1}^{M} AH^{(i)} R^{(i)} (H^{(i)})^* A. \quad (29)$$

Now observing the similarity of (27) with that of (4) in Section "ZF-LAS for V-BLAST: method" the LAS algorithm for MC CDMA can be arrived at, along the same lines as that of V-BLAST in the previous section, with $y_{veff}$, $H_{veff}$ and $H_{vreal}$ replaced by $y_{ceff}$, $H_{ceff}$, and $H_{creal}$, respectively, with all other notations, definitions, and procedures in the algorithm remaining the same.

ZF-LAS for MC CDMA: Complexity

In terms of complexity, given an initial vector, the LAS operation part alone has an average per-bit complexity of O(MK). This can be explained as follows. The complexity involved in the LAS operation is due o two components: i) initial computation of g(0) in (8), which requires O(MK) complexity per bit, and ii) update of g(n) as per (18), which requires O(K) complexity whenever there is a flip in a given step. So the total average per-bit complexity in ii) in the above is determined by the average number of flips per bit, referred to as the bit flip rate. From simulations (which will be shown in the next subsection), we find that these flip operations have constant average per-bit complexity c, where the constant c depends on SNR, a, and the initial vector b(0). So, putting the complexities of i) and ii) in the above together, we see that the average per-bit complexity of LAS operation alone is O(MK). Also, the initial vector generation using ZF has a complexity of O(K²) for K>M, and so the overall average per-bit complexity of ZF-LAS detector for MC-CDMA is O(K²). If the MF output is used as the initial vector instead, then the overall average per-bit complexity of the MF-LAS is the same as that of the LAS alone, which is O(MK). For the MC CDMA system considered, we will see that the MF-LAS, with lesser complexity than ZF-LAS, performs very close to ZF-LAS. Therefore, MF-LAS is quite attractive in terms of complexity as well as performance in the MC-CDMA systems considered.

ZF-LAS for MC CDMA: Performance Results & Discussions

We evaluated the BER performance and complexity of the ZF-LAS algorithm for MC CDMA through extensive simulations. We also evaluated the complexity of the LAS part in the algorithm in terms of average number of flips performed per bit, which, as we mentioned above, refer to as the bit flip rate (BFR). We evaluate the BER and BFR performance measures for LAS as a function of average SNR, number of users (K), number of subcarriers (M), number of chips per bit (N). We also evaluate the BER performance of ZF-LAS as a function of loading factor, $\alpha$, where, as done in the CDMA literature [14], we define $\alpha$ $$\frac{K}{MN}.$$

We call the system as underloaded when $\alpha<1$, fully loaded when $\alpha=1$, and overloaded when $\alpha>1$. Random binary sequences of length N are used as the spreading sequences on each subcarrier. In order to make a fair comparison between the performance of MC CDMA systems with different number of subcarriers, we keep the system and width the same by keeping MN constant. Also, in that case we keep the total transmit power to be the same irrespective of the number of subcarriers used. In the simulation plots we show here, we have assumed that all users transmit with equal amplitude (We note that we have simulated the ZF/MF-LAS performance in near-far conditions as well. Even with near-far effect, the ZF/MF-LAS has been observed to achieve near SU performance). The LAS algorithm used is the SLAS with circular checking of bits starting from the first user's bit. First, in FIG. 9, we present the BER performance of ZF-LAS as a function of average SNR in a single carrier (i.e., M=1) underloaded system, where we consider $\alpha=\frac{2}{3}$ by taking K=200 users and N=300 chips per bit. For comparison purposes, we also plot the performance of i) MF detector, ii) ZF detector, and iii) MF-LAS detector. Single user (SU) performance which corresponds to the case of no multiuser interference (i.e., K=1) is also shown as a lower bound on the achievable multiuser performance. From FIG. 9, we can observe that the performance of MF and ZF detectors are far away from the SU performance. Whereas, the ZF-LAS as well as MF-LAS detectors almost achieve the SU performance. We point out that, like ZF detector, other suboptimum detectors including MMSE, SIC, and PIC detectors [14] also do not achieve near SU performance for the considered loading factor of $\frac{2}{3}$, whereas the MF-LAS detector achieves near SU performance, that too with a lesser complexity than these other suboptimum detectors.

Next, in FIG. 10, we show the BER performance of the ZF/MF-LAS detectors for M=1 as a function of number of users, K, for a fixed value of $\alpha=\frac{2}{3}$ at an average SNR of 15 dB. We varied K from 10 to 1000 users. SU performance is also shown (as the bottom most horizontal line) for comparison. It can be seen that, for the fixed value of $\alpha=\frac{2}{3}$, both the MF-LAS as well as the ZF-LAS achieve near SU performance, whereas the ZF and MF detectors do not achieve the SU performance. In FIG. 11, we show the BER performance of the ZF/MF-LAS detectors as a function of average SNR for different number of subcarriers, namely, M=1, 2, 4, keeping a constant MN=100, for a fully loaded system (i.e., $\alpha=1$) with K=100. Keeping $\alpha=1$ and K=100 for all cases means that i) N=100 for M=1, ii) N=50 for M=2, and iii) N=25 for M=4. The SU performance for M=1 (1st order diversity), M=2 ($2^{nd}$ order diversity), and M=4 (4th order diversity) are also plotted for comparison. These diversities are essentially due to the frequency diversity effect resulting from multicarrier combining of signals from M subcarriers. It is interesting to see that even in a fully loaded system, the ZF/MF-LAS detectors achieve all the frequency diversity possible in the system (i.e., ZF/MF-LAS detectors achieve SU performance with 1st, 2nd and 4th order diversities for M=1, 2 and 4, respectively). On the other hand, ZF detector is unable to achieve the frequency diversity in the fully loaded system, and its performance is very poor compared to ZF/MF-LAS detectors.

Next, in FIG. 12, we present the BER performance of ZF/MF-LAS detectors in a MC CDMA system with M=4 as a function of loading factor, $\alpha$, where we vary $\alpha$ from 0.025 to 1.5. We realize this variation in _by fixing K=30, M=4, and varying N from 300 to 5. The average SNR considered is 8 dB. From FIG. 12, it can be observed that as _increases all detectors loose performance, but the ZF/MF-LAS detectors can offer relatively good performance even at overloaded conditions of $\alpha>1$. Another observation is that at $\alpha>1$, MF-LAS performs slightly better than ZF-LAS. This is because $\alpha>1$ corresponds to a high interference condition, and it is known in MUD literature [14] that ZF can perform worse than MF at low SNRs and high interference. In such cases, starting with a better performing MF output as the initial vector, MF-LAS performs better.

Finally, in FIG. 13, we present the complexity of the flip operations in the LAS algorithm, in terms of BFR (bit flip rate) obtained from simulations. BFR as a function of number of users K is plotted for different values of average SNR and loading factor, α, for M=1. It can be seen that the BFR remains constant as a function of K, implying that the LAS operation has a constant average per-bit complexity in K. As can be seen, this constant depends on the values of SNR and α, and the initial vector used. For example, the BFR decreases with increasing SNR. This is because, for a given initial detector, at high SNRs, the initial vector is less erroneous and so the fixed point is reached in less number of search steps. For a similar reason, BFR is less for small values of α. As pointed out in Section "ZF-LAS for MC CDMA: complexity". since the BFR operations have only a constant average per-bit complexity, it is the initial detector's complexity which dominates the overall complexity. Based on the above, we note that MF-LAS is quite attractive in terms of complexity as well as performance in the MC CDMA systems considered.

Further to our present work on the application of ZF MF-LAS for MC CDMA, several extensions are possible on the practical application of ZF/MF-LAS in CDMA. Two such useful extensions include i) ZF/MF-LAS for frequency selective CDMA channels with RAKE combining; we point out that a similar approach and system model adopted here for MC CDMA is applicable, by taking a view of equivalence between frequency diversity through MC combining and multipath diversity through RAKE combining, and ii) ZF/MF-LAS for asynchronous CDMA systems, which can be carried out once the system model is appropriately written [14] in a form similar to (20). These two extensions can allow ZF/MF-LAS detectors to be practical in CDMA systems (e.g., 2 G and 3 G CDMA systems), with potential for significant gains in system capacity. Current approaches to MUD in practical CDMA systems are mainly PIC and SIC. However, the illustrated fact that MF-LAS can easily outperform PIC/SIC detectors in performance and complexity for large number of users suggests that MF-LAS can be a powerful MUD approach in practical CDMA applications.

MIMO systems with multiple antennas at both transmitter and receiver sides have become very popular owing to the several advantages they promise to offer, including high data rates and transmit diversity. FIG. 14 shows an example of a MIMO system that has $N_t$ number of transmit antennas at the transmitter and $N_r$ number of receiv antennas at the receiver. The transmit signal passes through the MIMO fading channel. The channel gain form one transmitter antenna to one receiving antenna is characterized by a random channel gain. It is known that the MIMO channels have a capacity that grows linearly with the minimum of the number of antennas on the transmitter and receiver sides. A key component of a MIMO system is the MIMO detector at the receiver, whose job is to recover the symbols that are transmitted simultaneously from multiple transmitting antennas. In practical applications, the MIMO detector is often the bottleneck for both performance and complexity.

CONCLUSIONS

In this invention, we presented a low-complexity detector, termed as ZF-LAS (zero-forcing likelihood ascent search) detector, for large MIMO systems with antennas of the order of tens to thousands, including V-BLAST as well as non-orthogonal STBC. The complexity advantage of this detector compared to other known detectors like ZF-SIC detector is remarkable for large MIMO systems; $O(N_tN_r)$ for ZF-LAS versus $O(N_t^2N_r)$ for ZF-SIC. We conclude this paper by pointing to the following remark made by the author of [2] in its preface in 2005: "It was just a few years ago, when I started working at AT&T Labs—Research, that many would ask 'who would use more than one antenna in a real system?' Today, such skepticism is gone." Extending this sentiment, we believe large MIMO systems would be practical in the future, and the feasibility of low-complexity detectors like the ZF-LAS detector presented in this invention, could be a potential trigger to create wide interest in the theory and practice of large MIMO systems. Instant invention does not posses limitation of number of antennas as such.

APPENDIX

Let $x=[x_1 x_2 \ldots x_{16}]$ denote the data symbol vector. Then, the symbols $\{s_{ij}\}$ $i,j,\in\{1,2,3,4\}$ in the space-time block code S in Eqn. (19) are given by $$s_{11} = x_1 + x_2 e^{\frac{j2\pi}{16}} + x_3 e^{\frac{j4\pi}{16}} + x_4 e^{\frac{j6\pi}{16}},$$

$$s_{21} = x_5 + x_6 e^{\frac{j2\pi}{16}} + x_7 e^{\frac{j4\pi}{16}} + x_8 e^{\frac{j6\pi}{16}},$$

$$s_{31} = x_9 + x_{10} e^{\frac{j2\pi}{16}} + x_{11} e^{\frac{j4\pi}{16}} + x_{12} e^{\frac{j6\pi}{16}},$$

$$s_{41} = x_{13} + x_{14} e^{\frac{j2\pi}{16}} + x_{15} e^{\frac{j4\pi}{16}} + x_{16} e^{\frac{j6\pi}{16}},$$

$$s_{12} = e^{\frac{j}{2}}\left(x_{13} + jx_{14} e^{\frac{j2\pi}{16}} - x_{15} e^{\frac{j4\pi}{16}} - jx_{16} e^{\frac{j6\pi}{16}}\right),$$

$$s_{22} = x_1 + jx_2 e^{\frac{j2\pi}{16}} - x_3 e^{\frac{j4\pi}{16}} - jx_4 e^{\frac{j6\pi}{16}},$$

$$s_{32} = x_5 + jx_6 e^{\frac{j2\pi}{16}} - x_7 e^{\frac{j4\pi}{16}} - jx_8 e^{\frac{j6\pi}{16}},$$

$$s_{42} = x_9 + jx_{10} e^{\frac{j2\pi}{16}} - x_{11} e^{\frac{j4\pi}{16}} - jx_{12} e^{\frac{j6\pi}{16}},$$

$$s_{13} = e^{\frac{j}{2}}\left(x_9 - x_{10} e^{\frac{j2\pi}{16}} + x_{11} e^{\frac{j2\pi}{16}} - x_{12} e^{\frac{j6\pi}{16}}\right),$$

$$s_{23} = e^{\frac{j}{2}}\left(x_{13} - x_{14} e^{\frac{j2\pi}{16}} + x_{15} e^{\frac{j4\pi}{16}} - x_{16} e^{\frac{j6\pi}{16}}\right),$$

$$s_{33} = x_1 - x_2 e^{\frac{j2\pi}{16}} + x_3 e^{\frac{j4\pi}{16}} - x_4 e^{\frac{j6\pi}{16}},$$

$$s_{43} = x_5 - x_6 e^{\frac{j2\pi}{16}} + x_7 e^{\frac{j4\pi}{16}} - x_8 e^{\frac{j6\pi}{16}},$$

$$s_{14} = e^{\frac{j}{2}}\left(x_5 - jx_6 e^{\frac{j2\pi}{16}} - x_7 e^{\frac{j4\pi}{16}} + jx_8 e^{\frac{j6\pi}{16}}\right),$$

$$s_{24} = e^{\frac{j}{2}}\left(x_9 - jx_{10} e^{\frac{j2\pi}{16}} - x_{11} e^{\frac{j4\pi}{16}} + jx_{12} e^{\frac{j6\pi}{16}}\right),$$

$$s_{34} = e^{\frac{j}{2}}\left(x_{13} - jx_{14} e^{\frac{j2\pi}{16}} - x_{15} e^{\frac{j4\pi}{16}} + jx_{16} e^{\frac{j6\pi}{16}}\right),$$

$$s_{44} = x_1 - jx_2 e^{\frac{j2\pi}{16}} - x_3 e^{\frac{j4\pi}{16}} + jx_4 e^{\frac{j6\pi}{16}}.$$

We claim:
1. A method to detect data transmitted from multiple transmit antennas, said method comprising:
   receiving the transmitted data using multiple receive antennas;
   detecting the transmitted data from the multiple receive antennas using a zero-forcing (ZF) data detector, said ZF data detector producing an output data block;
   detecting the transmitted data from the output data block using a likelihood ascent search (LAS) data detector, said detection step using the LAS data detector includes:
   i. selecting the output data block as a starting data block and calling the starting data block as previous data block;
   ii. defining a set of indices of bits to be checked for possible flip in the previous data block as a check candidate set;
   iii. applying an update rule to obtain updated data block using the previous data block and the check candidate set, wherein the update is made in such a manner that change in likelihood is positive; and iv. checking if the updated data block and several consecutive previous data blocks are the same; if yes, declare the updated data block as the detected data block; if no, make updated data block as previous data block and go to step ii, and wherein the transmit and receive antennas include at least ten in number.

2. The method as claimed in claim 1, wherein the sequence of check candidate set is chosen such that the bits are checked for possible flip in an order.

3. The method as claimed in claim 2, wherein the order is circular or random.

4. The method as claimed in claim 1, wherein the method provides for checking of multiple bits for possible flip.

5. The method as claimed in claim 1, wherein the method of defining update rule comprises steps of
   i. making $k^{th}$ bit +1 in $(n+1)^{th}$ step data block if $k^{th}$ bit of the $n^{th}$ step data block is −1 and gradient of likelihood function corresponding to the $k^{th}$ bit in the $n^{th}$ step data block is greater than a threshold corresponding to the $k^{th}$ bit in the $n^{th}$ step data block;
   ii. making $k^{th}$ bit −1 in $(n+1)^{th}$ step data block if $k^{th}$ bit of the $n^{th}$ step data block is +1 and gradient of likelihood function corresponding to the $k^{th}$ bit in the $n^{th}$ step data block is less than a threshold corresponding to the $k^{th}$ bit in the $n^{th}$ step; and
   iii. if conditions in (i) and (ii) are not satisfied the $k^{th}$ bit in $(n+1)^{th}$ step data block is kept same as $k^{th}$ bit value in the $n^{th}$ step data block.

6. The method as claimed in claim 1, wherein signals transmitted from the antennas occupy same transmission bandwidth using same modulation format of either BPSK or QPSK.

7. The method as claimed in claim 1, wherein the method provides for low complexity detection with linear or quadratic complexity in multiple number of antennas.

8. The method as claimed in claim 1, wherein the method provides for near maximum-likelihood (ML) performance for multiple antennas in the range of tens to thousands.

9. The method as claimed in claim 1, wherein the method provides for spectral efficiencies of the order of tens to thousands of bps/Hz.

10. The method as claimed in claim 1, wherein the method provides for spatial processing gain equal to the number of transmit antennas by exploiting the spatial dimensions without expanding the transmission bandwidth.

11. The method as claimed in claim 1, wherein the method provides for reduction in $E_b/No$ (Bit energy to noise spectral density ratio) by a factor of the number of transmit antennas without expanding the transmission bandwidth.

12. The method as claimed in claim 1, wherein the method employs the data transmissions using higher order modulation format selected from a group comprising M-ary Quadrature Amplitude Modulation (M-QAM), M-ary Pulse Amplitude Modulation (M-PAM) and M-ary Phase Shift Keying (M-PSK).

13. The method as claimed in claim 1, wherein the method detects data symbols transmitted from multiple transmit antennas using MIMO technique selected from a group comprising Space-Time Block Coding (STBC) and V-BLAST.

14. The method as claimed in claim 1, wherein the method provides for detection in distributed/cooperative MIMO systems and networks with multiple number of co-operating nodes.

15. The method as claimed in claim 1, wherein the method provides for detection in Ultra-wide band (UWB) systems with multiple users, multiple channel taps and multiple subcarriers.

16. The method as claimed in claim 1, wherein the method provides for detection in underwater acoustic communications with multiple nodes deployed to sense and send information.

17. The method as claimed in claim 1, wherein the method provides for detection in multi-user OFDM and MIMO-OFDM systems with multiple subcarriers.

18. The method as claimed in claim 1, wherein the method provides for detection in outer-coded MIMO systems with out-code selected form group comprising turbo coding, LDPC coding, convolutional coding and block coding.

19. A Multiple Input Multiple Output (MIMO) system comprising:
   multiple transmit antennas for data transmission;
   multiple receive antennas for data reception;
   a zero-forcing (ZF) data detector to detect transmitted data from the multiple receive antennas to produce an output data block; and
   a likelihood ascent search (LAS) data detector to determine a detected data block from the output data block, said LAS data detector being configured to:
   i. select the output data block as a starting data block and call the starting data block as previous data block;
   ii. define a set of indices of bits to be checked for possible flip in the previous data block as a check candidate set;
   iii. apply an update rule to obtain updated data block using the previous data block and the check candidate set, wherein the update is made in such a manner that change in likelihood is positive; and
   iv. check if the updated data block and several consecutive previous data blocks are the same; if yes, declare the updated data block as the detected data block; if no, make updated data block as previous data block and go to ii, and
   wherein the transmit antennas and receive antennas include at least ten in number.

20. The system as claimed in claim 19, wherein signals transmitted from the antennas occupy same transmission bandwidth using same modulation format of either BPSK or QPSK.

21. The system as claimed in claim 19, wherein the system employs MIMO technique selected from a group comprising Space-Time Block Coding (STBC) and V-BLAST.

22. The system as claimed in claim 19, wherein the system provides for low complexity detection with linear or quadratic complexity in multiple number of antennas.

23. The system as claimed in claim 19, wherein the system provides for near maximum-likelihood (ML) performance for multiple antennas in the range of tens to thousands.

24. The system as claimed in claim 19, wherein the system provides for spectral efficiencies of the order of tens to thousands of bps/Hz.

25. The system as claimed in claim 19, wherein the system provides spatial processing gain equal to the number of transmit antennas by exploiting the spatial dimensions without expanding the transmission bandwidth.

26. The system as claimed in claim 19, wherein the system provides for reduction in $E_b/No$ (Energy per bit to noise spectral density ratio) by a factor of the number of transmit antennas without expanding the transmission bandwidth.

27. The system as claimed in claim 19, wherein the system employs the data transmissions using higher order modulation format selected from a group comprising M-ary Quadrature Amplitude Modulation (M-QAM), M-ary Pulse Amplitude Modulation (M-PAM) and M-ary Phase Shift Keying (M-PSK).

28. The system as claimed in claim 19, wherein the system provides for detection in outer-coded MIMO systems with outer-code selected from a group comprising turbo coding, LDPC coding, convolutional coding and block coding.

* * * * *